US011245499B2

United States Patent
Lei et al.

(10) Patent No.: US 11,245,499 B2
(45) Date of Patent: Feb. 8, 2022

(54) SIGNALING OVERHEAD REDUCTION IN NOMA

(71) Applicant: QUALCOMM Incorporated, San Diego, CA (US)

(72) Inventors: Jing Lei, San Diego, CA (US); Joseph Binamira Soriaga, San Diego, CA (US); Seyong Park, San Diego, CA (US); Jay Kumar Sundararajan, San Diego, CA (US); Gabi Sarkis, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/438,086

(22) Filed: Jun. 11, 2019

(65) Prior Publication Data

US 2019/0393998 A1    Dec. 26, 2019

Related U.S. Application Data

(60) Provisional application No. 62/689,048, filed on Jun. 22, 2018.

(51) Int. Cl.
*H04L 5/00* (2006.01)
*H04W 76/11* (2018.01)
(Continued)

(52) U.S. Cl.
CPC .......... *H04L 5/0005* (2013.01); *H04L 1/0004* (2013.01); *H04L 1/0061* (2013.01);
(Continued)

(58) Field of Classification Search
None
See application file for complete search history.

(56) References Cited

U.S. PATENT DOCUMENTS

2018/0063821 A1\* 3/2018 Huang ............... H04L 5/001
2018/0124684 A1   5/2018 Kwon et al.
(Continued)

FOREIGN PATENT DOCUMENTS

WO    2018031620 A1    2/2018

OTHER PUBLICATIONS

Intel Corporation: "NOMA related procedure", 3GPP Draft; R1-1806533—Intel—NOMA Procedure, 3rd Generation Partnership Project (3GPP), Mobile Competence Centre ; 650, Route Des Lucioles ; F-06921 Sophia-Antipolis Cedex; France, vol. RAN WG1, No. Busan, Korea; May 21, 2018-May 25, 2018, May 20, 2018 (May 20, 2018), XP051441735, 8 Pages, Retrieved from the Internet: URL:http://www.3gpp.org/ftp/Meetings%5F3GPP%5FSYNC/RAN1/Docs/ [retrieved on May 20, 2018], sections 1-3.
(Continued)

*Primary Examiner* — Gregory B Sefcheck
*Assistant Examiner* — Amarnauth G Persaud
(74) *Attorney, Agent, or Firm* — Procopio, Cory, Hargreaves, LLP; Nerrie M. Zohn

(57) ABSTRACT

The present disclosure relates to methods and devices for communicating based on improved signaling. A base station can transmit an indication of resources in time and frequency to a UE allocated for NOMA communication with the UE. The indication of resources can comprise a set of NA-RUs. The UE can then transmit uplink NOMA communication to the base station based on the indication of resources received from the base station. Also, the base station can transmit a compact UL resource grant via DCI, or signal the semi-static transport format configuration via
(Continued)

RRC, to the UEs allocated for NOMA communication. The DCI or the payload of RRC signaling can be scrambled with a NOMA group RNTI, as well as comprise NOMA transmission parameters indicated by a MCS table. The UE can then transmit uplink NOMA communication to the base station based on the DCI or the RRC signaling.

44 Claims, 25 Drawing Sheets

(51) Int. Cl.

| | | |
|---|---|---|
| *H04W 76/27* | (2018.01) | |
| *H04L 1/16* | (2006.01) | |
| *H04W 72/04* | (2009.01) | |
| *H04W 72/14* | (2009.01) | |
| *H04L 1/00* | (2006.01) | |
| *H04W 88/02* | (2009.01) | |
| *H04W 88/08* | (2009.01) | |

(52) U.S. Cl.
CPC ......... *H04L 1/1614* (2013.01); *H04W 72/042* (2013.01); *H04W 72/0446* (2013.01); *H04W 72/0453* (2013.01); *H04W 72/14* (2013.01); *H04W 76/11* (2018.02); *H04W 76/27* (2018.02); *H04W 88/02* (2013.01); *H04W 88/08* (2013.01)

(56) References Cited

U.S. PATENT DOCUMENTS

| | | | | |
|---|---|---|---|---|
| 2018/0376409 A1* | 12/2018 | Tani | ...................... | H04W 48/10 |
| 2020/0045658 A1* | 2/2020 | Nam | ................... | H04W 56/001 |
| 2020/0092875 A1* | 3/2020 | Takeda | ................ | H04W 72/048 |
| 2020/0205159 A1* | 6/2020 | Tang | ..................... | H04L 1/1614 |
| 2020/0221404 A1* | 7/2020 | Takeda | ................ | H04W 72/042 |

OTHER PUBLICATIONS

Partial International Search Report—PCT/US2019/036789—ISA/EPO—dated Sep. 4, 2019.

Fujitsu: "Considerations on NOMA Related Procedures", 3GPP TSG RAN WG1 Meeting #92bis, 3GPP Draft; R1-1803946 Considerations on NOMA Related Procedures, 3rd Generation Partnership Project (3GPP), Mobile Competence Centre, 650, Route Des Lucioles, F-06921 Sophia-Anti Polis Cedex, France, vol. RAN WG1, No. Sanya, China; Apr. 16, 2018-Apr. 20, 2018, Apr. 15, 2018 (Apr. 15, 2018), pp. 1-3, XP051426236, Retrieved from the Internet URL: http://www.3gpp.org/ftp/Meetings%5F3GPP%5FSYNC/RAN1/Docs/ [retrieved on Apr. 15, 2018], Section 2.

Interdigital Inc: "On Collision Mitigation and Handling for Non-orthogonal Multiple Access", 3GPP TSG RAN WG1 Meeting #93, 3GPP Draft; R1-1807029, 3rd Generation Partnership Project (3GPP), Mobile Competence Centre, 650, Route Des Lucioles ; F-06921 Sophia-Antipolis Cedex, France, vol. RAN WG1, No. Busan, South Korea; May 21, 2018-May 25, 2018, May 20, 2018 (May 20, 2018), pp. 1-3, XP051442227, Retrieved from the Internet: URL: http://www.3gpp.org/ftp/Meetings%5F3GPP%5FSYNC/RAN1/Docs/ [retrieved on May 20, 2018].

International Search Report and Written Opinion—PCT/US2019/036789—ISA/EPO—dated Dec. 11, 2019.

Qualcomm Incorporated: "Procedures Related to NOMA", 3GPP TSG RAN WG1 Meeting #93, 3GPP Draft; R1-1807379 Procedures Related to NOMA, 3rd Generation Partnership Project (3GPP), Mobile Competence Centre, 650, Route Des Lucioles ; F-06921 Sophia-Anti polis Cedex, France, vol. RAN WG1, No. Busan, South Korea; May 21, 2018-May 25, 2018, May 20, 2018 (May 20, 2018), pp. 1-6, XP051442571, Retrieved from the Internet: URL: http://www.3gpp.org/ftp/Meetings%5F3GPP%5FSYNC/RAN1/Docs/ [retrieved on May 20, 2018], Sections 3, 3.1, 6.

\* cited by examiner

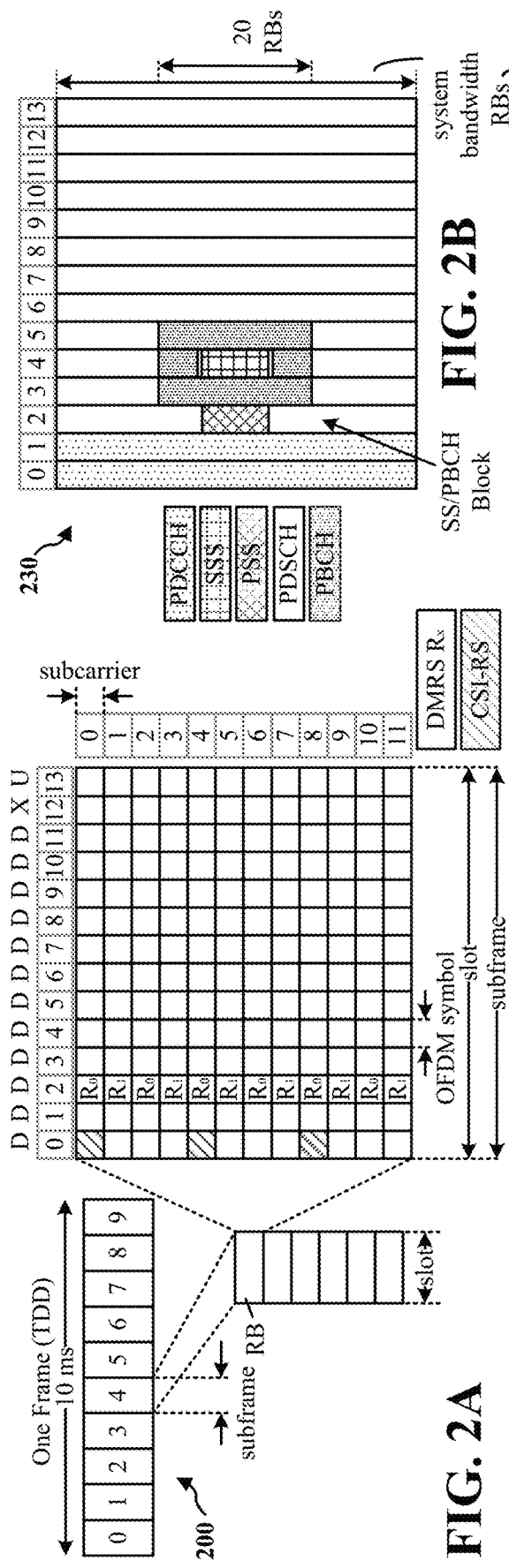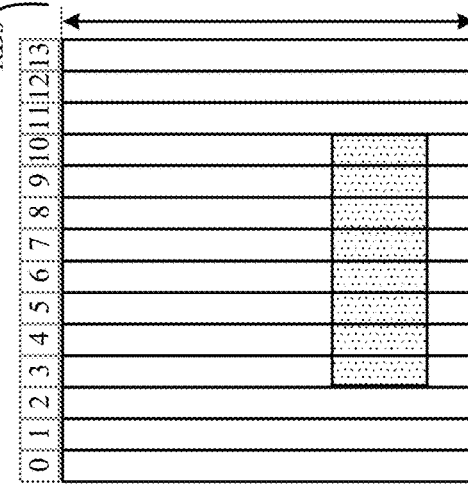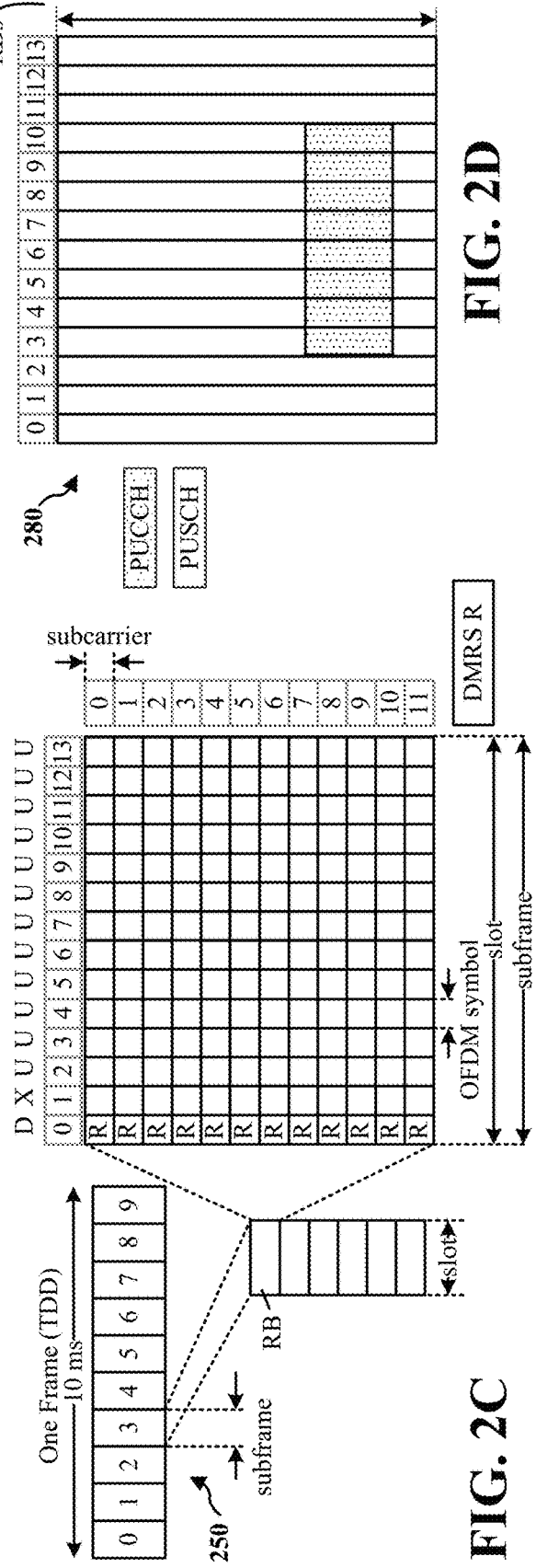

| NA-RU Index | 0 | 1 | 2 | 3 | ... | Q-1 |
|---|---|---|---|---|---|---|
| Bit Map 1 | 0 | 1 | 1 | 1 | ... | 0 |
| Bit Map 2 | 1 | 0 | 1 | 1 | ... | 1 |

FIG. 8

SIGNALING OVERHEAD REDUCTION IN NOMA

CROSS REFERENCE TO RELATED APPLICATION(S)

This application claims the benefit of U.S. Provisional Application Ser. No. 62/689,048, entitled "SIGNALING OVERHEAD REDUCTION IN NOMA" and filed on Jun. 22, 2018, which is expressly incorporated by reference herein in its entirety.

BACKGROUND

Technical Field

The present disclosure relates generally to communication systems, and more particularly, to methods and devices for reducing communications overhead.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communications, e.g., Millimeter Wave (mmW) wireless communication, base stations and UEs can transmit and/or receive a plurality of signals in order to facilitate communication between each other. Such signaling may increase the overhead of the communication system. If the signaling results in an increase in overhead, then any power savings or reduction in latency may be reduced or negated. In order to reduce the overhead as a result of this signaling, wireless communication systems can use Non-Orthogonal Multiple Access (NOMA) communication. Compared to transmissions such as Orthogonal Multiple Access (OMA), NOMA transmissions can reduce signaling overhead in a variety of ways, such as reducing signaling for resource allocation. By utilizing the concepts of grant-based and grant-free NOMA, the overhead of a wireless communication system can be reduced.

The present disclosure relates to methods and devices for communicating based on improved signaling of resources allocated for NOMA. A base station can transmit an indication of allocated resources in time and frequency to a UE for NOMA communication with the UE. The indication of resources can comprise a set of NOMA resource units (NA-RUs). The UE can then transmit uplink NOMA communication to the base station based on the indicated NA-RUs. The indication of the resources can also be based on a NOMA raster of candidate locations for the NA-RUs. Additionally, the set of NA-RUs can be indicated based on a predefined function. The indication of the resources can also be based on a bitmap for the set of the NA-RUs.

Furthermore, the indication of the resources can comprise a starting location of the set of the NA-RUs and a number of the NA-RUs comprised in the set. The indication can also comprise a starting location of the set of the NA-RUs, as well as an ending location of the set of the NA-RUs. The set of the NA-RUs can comprise a number of NA-RUs that are contiguous in time and/or frequency. The set of the NA-RUs can be interlaced in time and/or frequency within a superset of NA-RUs. In addition, the uplink NOMA communication may be transmitted to the base station without an uplink grant. In this sense, the uplink NOMA communication can be grant-free NOMA communication or configured grant NOMA communication.

The base station can also transmit downlink control information (DCI) to the UE for NOMA communication with the UE. The DCI can be scrambled with a NOMA group Radio Network Temporary Identifier (RNTI). The DCI can also comprise NOMA transmission parameters indicated by a modulation and coding scheme (MCS) table. The UE can then transmit uplink NOMA communication to the base station based on the DCI. The DCI may be received based on a group common control channel or Remaining Minimum System Information (RMSI) for a common resource allocation. The DCI can also comprise a cyclic redundancy check (CRC) that is scrambled by the NOMA group RNTI. Further, the DCI can comprise one or more NOMA transmission parameters indicated by the MCS table. The one or more NOMA transmission parameters can comprise a spreading factor for a NOMA transmission, a seed of scrambling code for the NOMA transmission, and/or one or more layers for multiple branch transmission of the NOMA transmission. The DCI can also comprise a multiple stage DCI scrambled by the NOMA group RNTI.

The base station can also transmit, and the UE can receive, a compressed uplink grant. The compressed uplink grant can be based on a table of NOMA transport formats. The compressed uplink grant can indicate an index for a transport format from among multiple transport formats for the uplink NOMA communication. In addition, the compressed uplink grant can comprise an index of at least one transport format that can be received through Radio Resource Control (RRC) signaling.

In an aspect of the disclosure, a method, a computer-readable medium, and an apparatus are provided for wireless communication at a UE. The apparatus can receive an indication of resources in time and frequency from a base station allocated for NOMA communication with the base station. The indication of resources can comprise a set of NA-RUs. Moreover, the apparatus can transmit uplink NOMA communication to the base station based on the indication of resources received from the base station.

In another aspect of the disclosure, a method, a computer-readable medium, and an apparatus are provided for wireless communication at a base station. The apparatus can transmit an indication of resources in time and frequency to a UE allocated for NOMA communication with the UE, wherein the indication of resources comprises a set of NA-RUs. Furthermore, the apparatus can receive uplink NOMA communication from the UE based on the indication of resources transmitted to the UE.

In a further aspect of the disclosure, a method, a computer-readable medium, and an apparatus are provided for wireless communication at a UE. The apparatus can receive DCI from a base station allocated for NOMA communication with the base station. The DCI can be scrambled with a NOMA group RNTI. The DCI can also comprise NOMA transmission parameters indicated by an MCS table. The apparatus can also transmit uplink NOMA communication to the base station based on the DCI received from the base station. In addition, the apparatus can receive a compressed uplink grant.

In a further aspect of the disclosure, a method, a computer-readable medium, and an apparatus are provided for wireless communication at a base station. The apparatus can transmit DCI to a UE allocated for NOMA communication with the UE. The DCI can be scrambled with a NOMA group RNTI. The DCI can also comprise NOMA transmission parameters indicated by an MCS table. The apparatus can also receive uplink NOMA communication from the UE based on the DCI transmitted to the UE. Moreover, the apparatus can transmit a compressed uplink grant.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

FIG. 8 displays another example of resource allocation according to the present disclosure.

DETAILED DESCRIPTION

Figure 1:
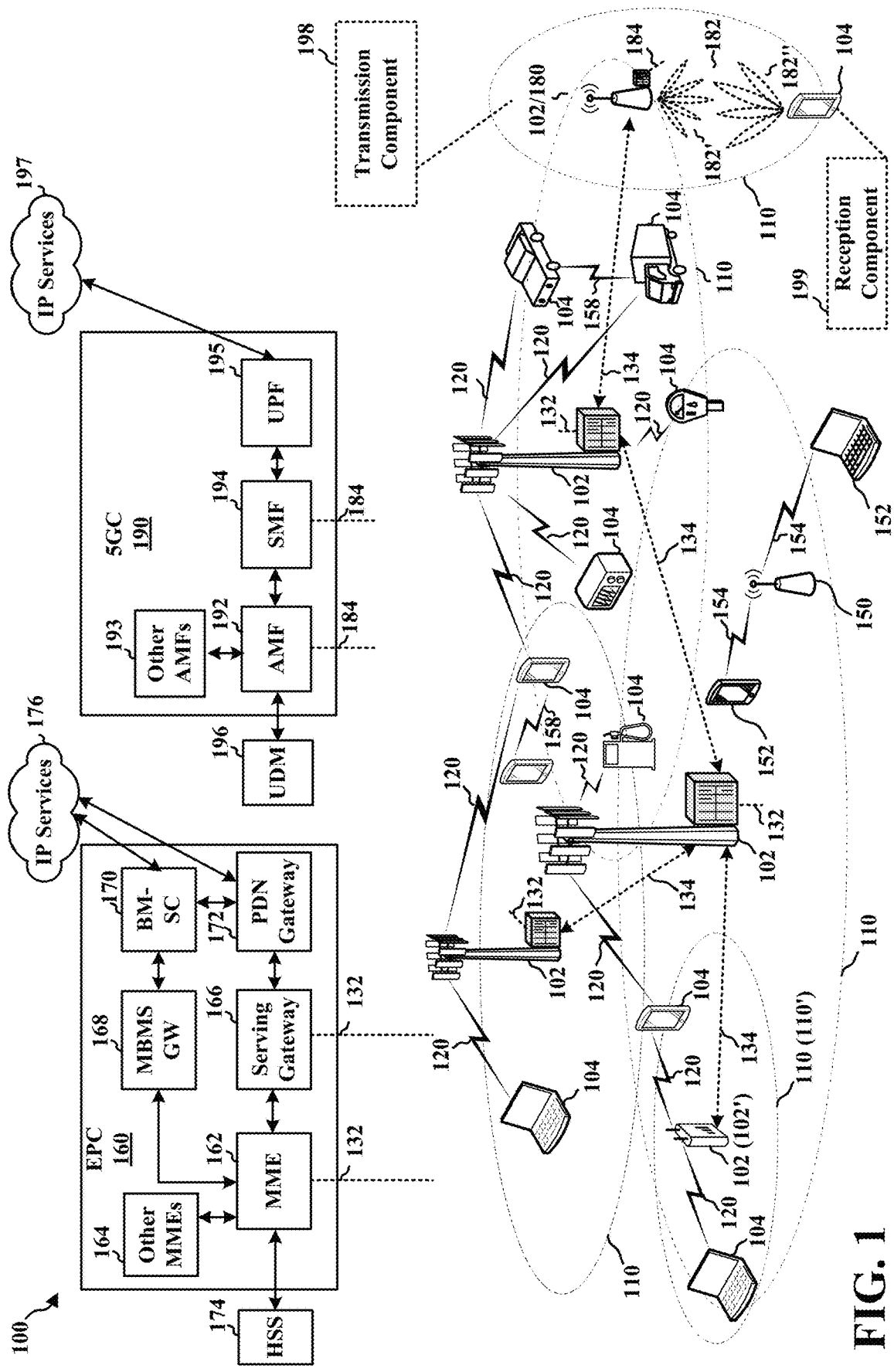
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, base station 102/180 may include a transmission component 198 configured to transmit an indication of resources in time and frequency to UE allocated for NOMA communication. Transmission component 198 can also be configured to receive uplink NOMA communication from UE based on indication of resources. Transmission component 198 can also be configured to transmit DCI or semi-static uplink resource grant to UE allocated for NOMA communication. Further, transmission component 198 can be configured to transmit compressed uplink resource grant by RRC signaling or compact DCI by PDCCH. Transmission component 198 can also be configured to receive uplink NOMA communication from UE based on DCI or semi-static uplink resource grant. In certain aspects, UE 104 may include a reception component 199 configured to receive an indication of resources in time and frequency from base station allocated for NOMA communication. Reception component 199 can also be configured to transmit uplink NOMA communication to base station based on indication of resources. Reception component 199 can also be configured to receive DCI or semi-static uplink resource grant from base station allocated for NOMA communication. Additionally, reception component 199 can be configured to receive compressed uplink resource grant by RRC signaling or compact DCI by PDCCH. Reception component 199 can also be configured to transmit uplink NOMA communication to base station based on DCI or semi-static uplink resource grant.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
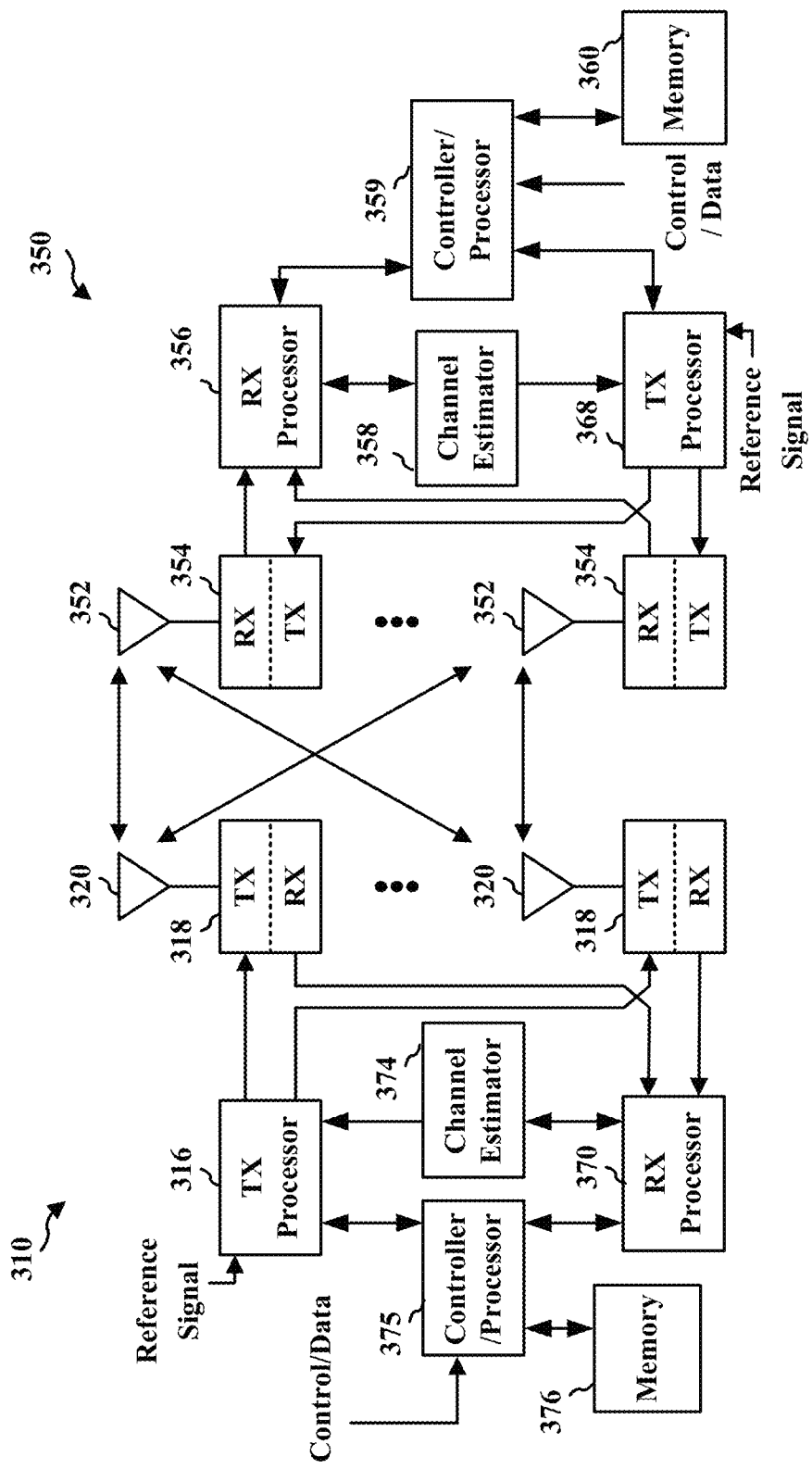
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
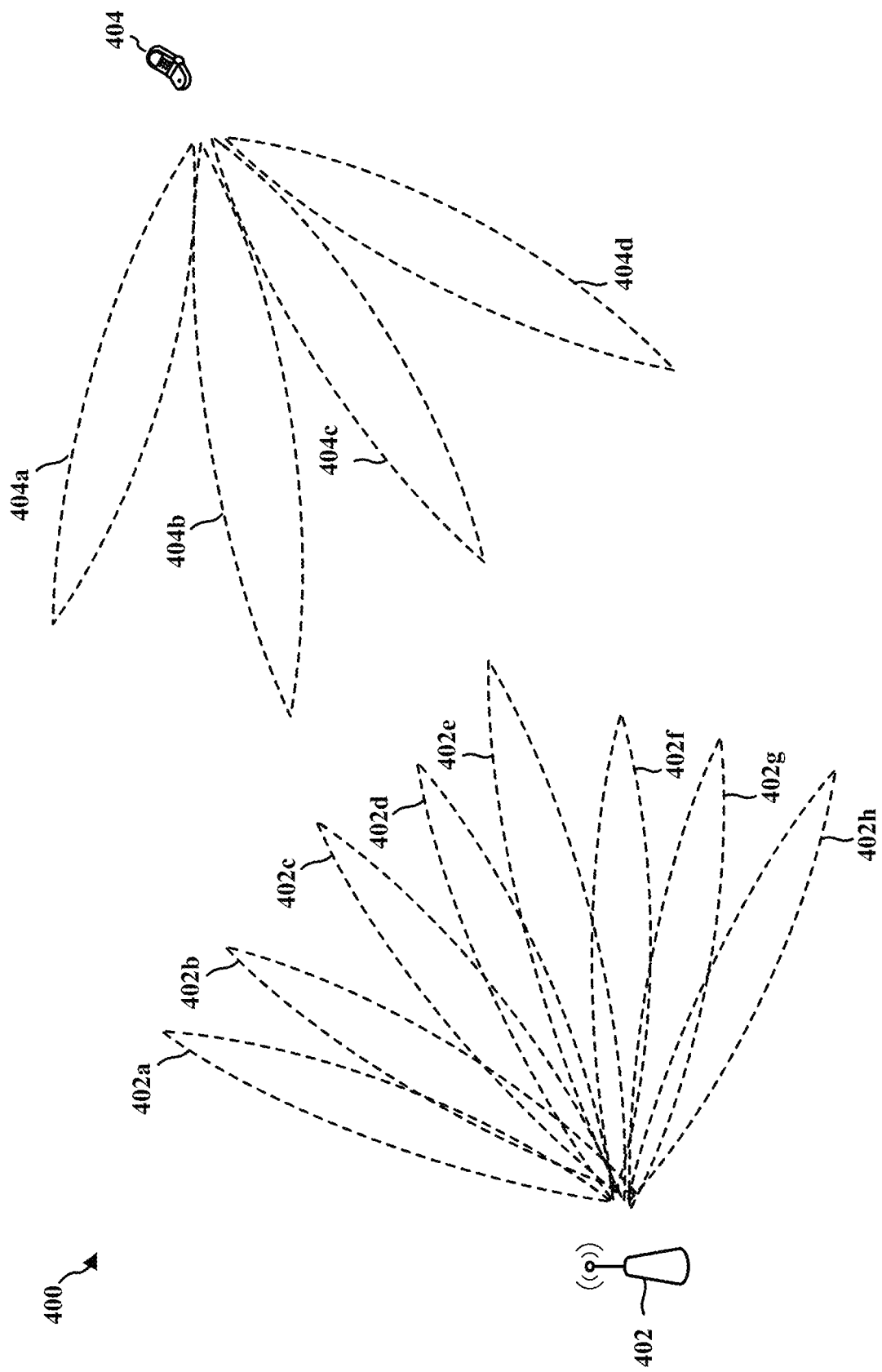
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In wireless communications, e.g., mmW wireless communication, base stations and UEs can transmit and/or receive a plurality of signals in order to facilitate communication between each other. Such signaling may require an increase in the overhead of the communication system. If the signaling results in an increase in overhead, then any power savings or reduction in latency may be reduced or negated. In order to reduce the overhead as a result of this signaling, wireless communication systems can use NOMA communication. NOMA communication can apply to different use cases. As an example, NOMA communication can focus on uplink transmissions with a base station as a receiver. In this example, the base station can be considered an advanced receiver with interference cancellation capabilities. A base station may comprise a gNB, for example. NOMA transmissions may include one more payload.

As indicated above, NOMA transmission can differ from traditional OMA transmission. In OMA transmissions, transmissions from different UEs are orthogonal to each other in time and/or frequency resources. Thus, the base station is able to identify the UE sending the transmission based on the time and/or frequency resources on which the transmission is received. In NOMA transmissions, different UEs share the time and frequency resources, e.g., data transmissions from different UEs are not orthogonal. NOMA transmissions may comprise a first data transmission and/or retransmissions. Such NOMA transmissions from UEs may be referred to as non-orthogonal uplink transmissions.

NOMA transmission may comprise a small payload. NOMA transmissions may enable possible savings of systems overhead, power reduction, and latency reduction. NOMA may be used in connection with massive machine-type communications (mMTC), ultra-reliable low-latency communications (URLLC), and enhanced mobile broadband (eMBB), e.g., for communication with small payloads. The aspects presented herein can be applicable to grant-based and/or grant-free transmissions. In these instances, NOMA transmissions can be referred to as grant-based NOMA and grant-free NOMA.

NOMA deployments may help to reduce signaling overhead. Signaling overhead reduction may be associated with power savings and latency reduction. Signaling in NOMA transmissions may include control channel signaling, e.g., PDCCH, which can carry the downlink and uplink scheduling information.

Compared to grant-based NOMA transmissions, grant-free or configured grant NOMA transmissions can save the signaling overhead for a scheduling request (SR) and dynamic DCI. Grant-based transmissions can use an uplink grant or SR, while grant-free transmissions may be sent without a specific uplink grant from the base station and/or SR from the UE. For grant-based NOMA, the NOMA data transmissions on the uplink may be scheduled by an uplink grant. In some aspects, the uplink grant can be transmitted on the PDCCH with DCI. Compared to grant-based OMA transmission, grant-based and grant-free NOMA can help to save the signaling overhead associated with resource allocation indication. In NOMA transmissions, even in grant-based NOMA transmissions, the NOMA UE can share the time and frequency resources with other NOMA UEs. In some aspects, a resource allocation indication can be common to multiple NOMA UEs. As will be discussed further herein, signaling overhead reduction schemes can be used with for grant-based and grant-free NOMA transmissions.

There are several ways that NOMA transmissions according to the present disclosure can reduce signaling overhead. For example, some NOMA transmissions can allow for a more efficient way to allocate resources for a first NOMA transmission, as well as any subsequent re-transmission. Shared time and/or frequency resources, e.g., for a group of NOMA UEs, can be partitioned into NOMA-specific resource units (NA-RUs). The NA-RUs may be indexed, and the indexes may be used to indicate NOMA resources to NOMA UEs.

Figure 5C:
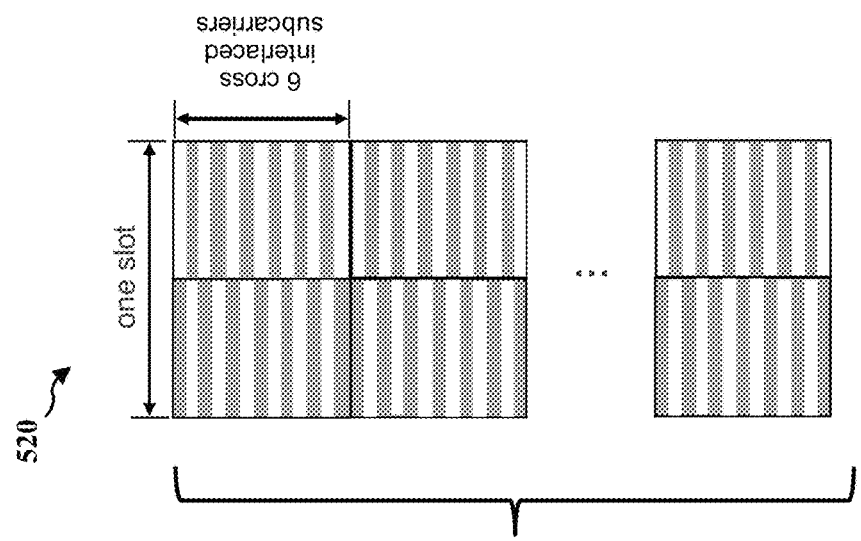
FIGS. 5A-5C display an example of resource configuration according to the present disclosure.
Figure 5B:
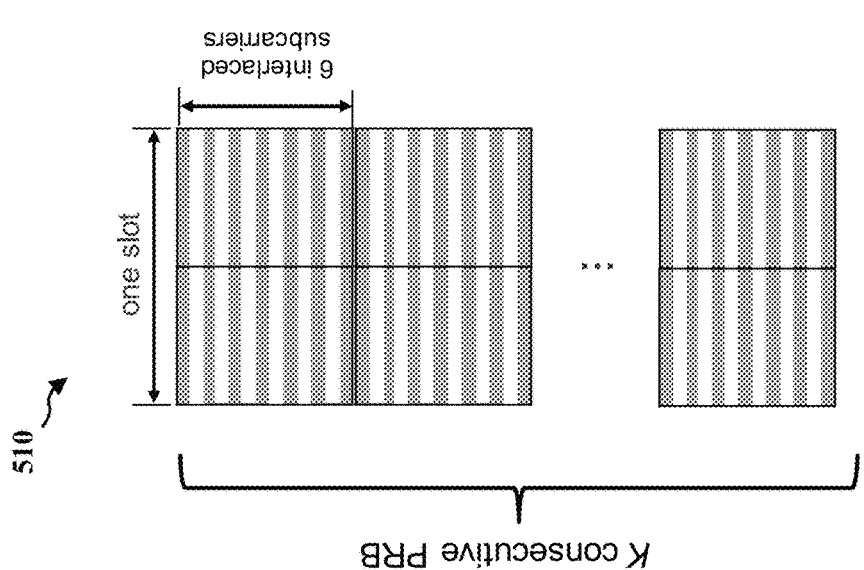
Figure 5A:
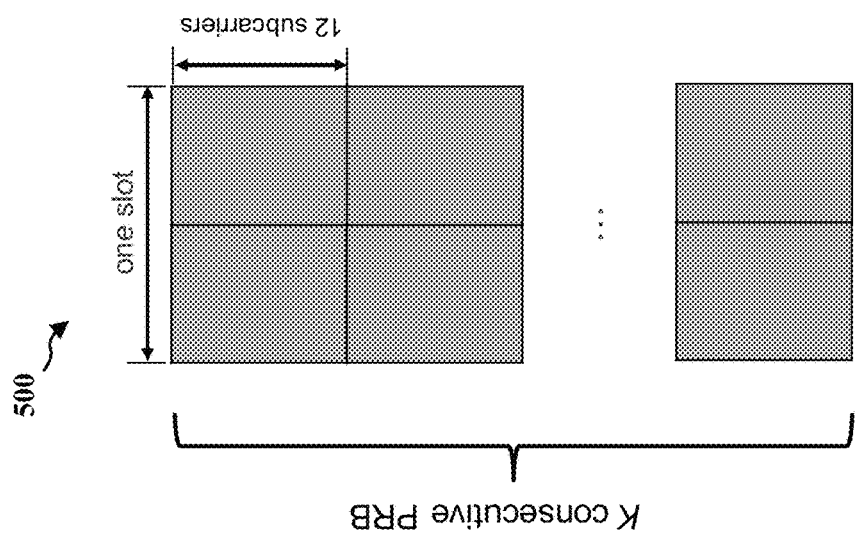
Figure 12:
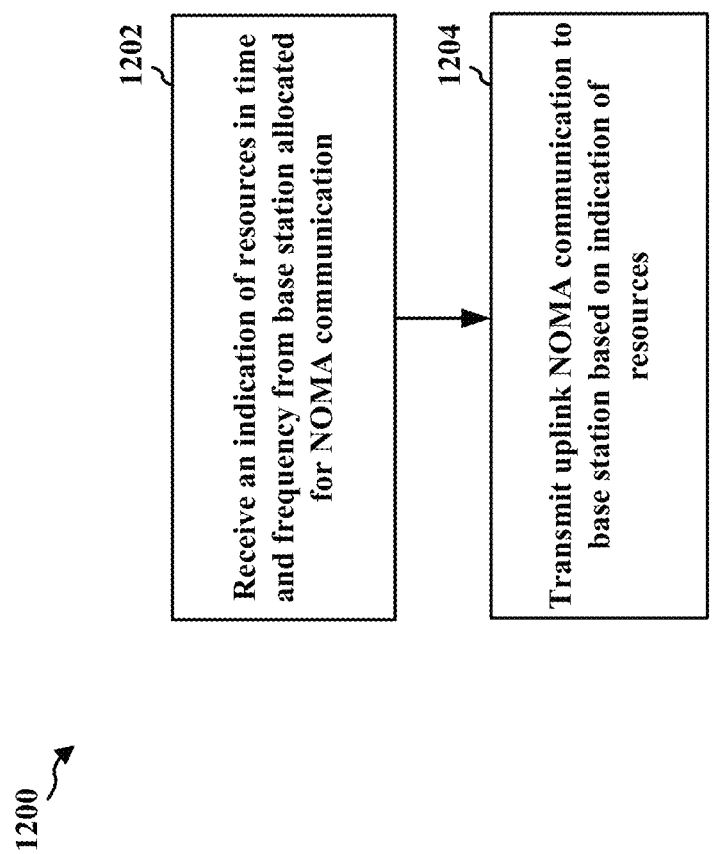
FIG. 12 is a flowchart of a method of wireless communication.

FIGS. 5A-5C display examples of shared time and/or frequency resources 500, 510, and 520, respectively, being partitioned into NA-RUs and indexed. In one example, as shown in FIG. 5A, 12 contiguous subcarriers or physical RB (PRB) pairs can comprise an NA-RU. In another example, as shown in FIG. 5B, six interlaced subcarriers or PRB pairs can comprise an NA-RU. FIG. 5B illustrates an example of interlacing in frequency. In another example, as shown in FIG. 5C, six cross interlaced subcarriers or PRB pairs can comprise an NA-RU. FIG. 5C illustrates an example of interlacing in both time and frequency. As mentioned herein, these PRB pairs can be contiguous or interlaced in time and/or frequency. For example, six PRB pairs can be in a single slot along the frequency spectrum. In other examples, a different number of PRB pairs may form an NA-RU.

As mentioned herein, NOMA transmissions can consider the signaling overhead impact on the wireless communication system. The use of NA-RUs to indicate NOMA resources can reduce the amount of overhead used to indicate NOMA resource allocation. By compacting the way in which resource units are indicated to the UE may reduce the amount of data that DCI use to convey the allocation information. In addition, multiple access for NOMA transmissions can cross correlate time and frequency resources, such that each of these resources can alternate with the other and/or be a contiguous block of resources. Accordingly, the time and/or frequency resources can be indexed as contiguous or interlaced.

Figure 6:
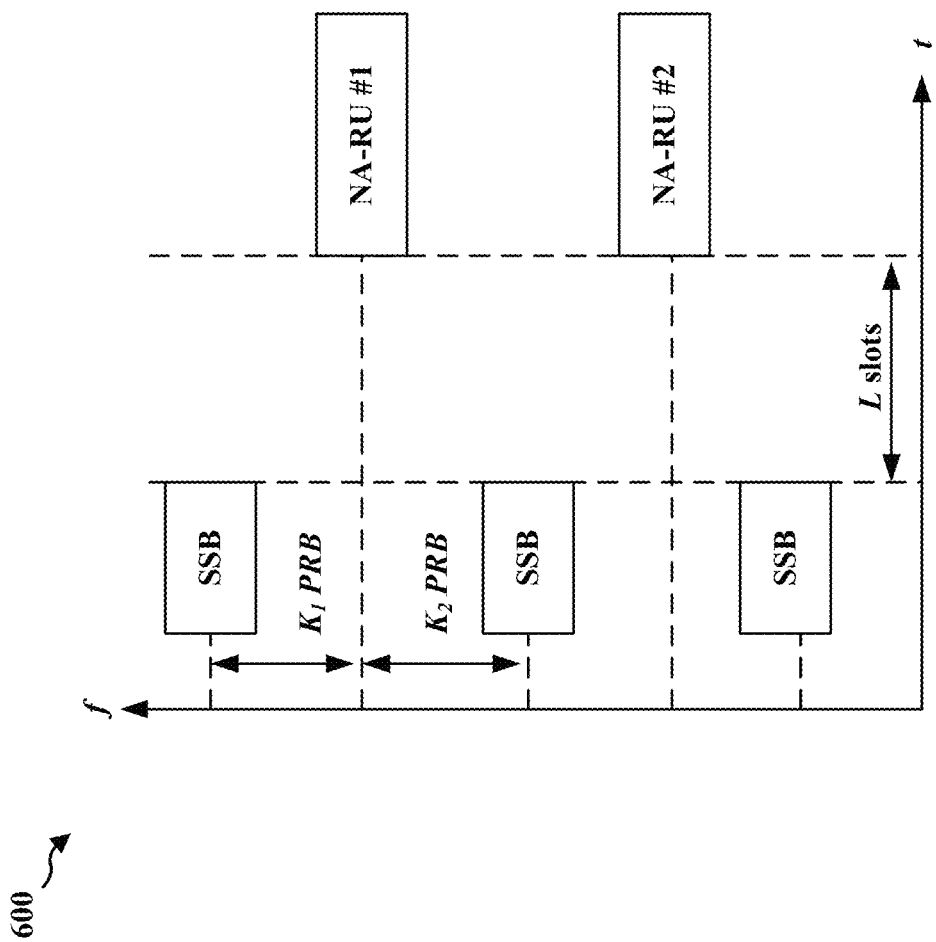
FIG. 6 displays one example of resource allocation according to the present disclosure.

FIG. 6 displays an example of resource allocation 600. Specifically, FIG. 6 shows a NOMA-specific raster for the candidate locations of NA-RUs. For example, NOMA resource allocation may be indicated based on a NOMA-specific raster for candidate locations of NA-RUs. A raster can limit the NOMA-specific frequencies to be within a range of RBs. Additionally, a raster can enable the NOMA transmissions to focus on frequency as well as time. The raster may provide parameters that are defined with respect to a signal. In FIG. 6, $\{K_1, K_2, L\}$ are defined with respect to one or more synchronization signal blocks (SSBs). For example, in FIG. 6, $K_1$ indicates a frequency offset from a first SSB, $K_2$ indicates a frequency offset from a second SSB, and L indicates a period of time. $\{K_1, K_2, L\}$ may be configurable parameters, which may be a function of system bandwidth, the size of NR-RU, and the associated subcarrier spacing (SCS). The base station may indicate a raster to the UE for NOMA communication, and the UE may use the raster to determine NA-RUs for transmitting NOMA communication to the base station.

In some instances, NOMA transmissions may target small payloads transmissions. However, other instances can allow for large payload transmissions. When using a raster, some NOMA transmissions can use a wide load SSB transmission, e.g., where the SSB transmission utilizes a wide bandwidth. Further, the amount of RBs used with the raster can be configured, e.g., based on the NOMA resource allocation. In some aspects, the raster can be centered around a middle frequency. For instance, the raster can comprise an even number of RBs centered around the center RB.

In another example, a NOMA resource allocation may be indicated based on a pre-defined function. For example, a set of NA-RUs may be mapped to a time and frequency grid with respect to an SSB based on a predefined function. The function may specify any of a center frequency of the NA-RUs, a subcarrier spacing, a number of PRBs within each NA-RU, etc.

Figure 7:
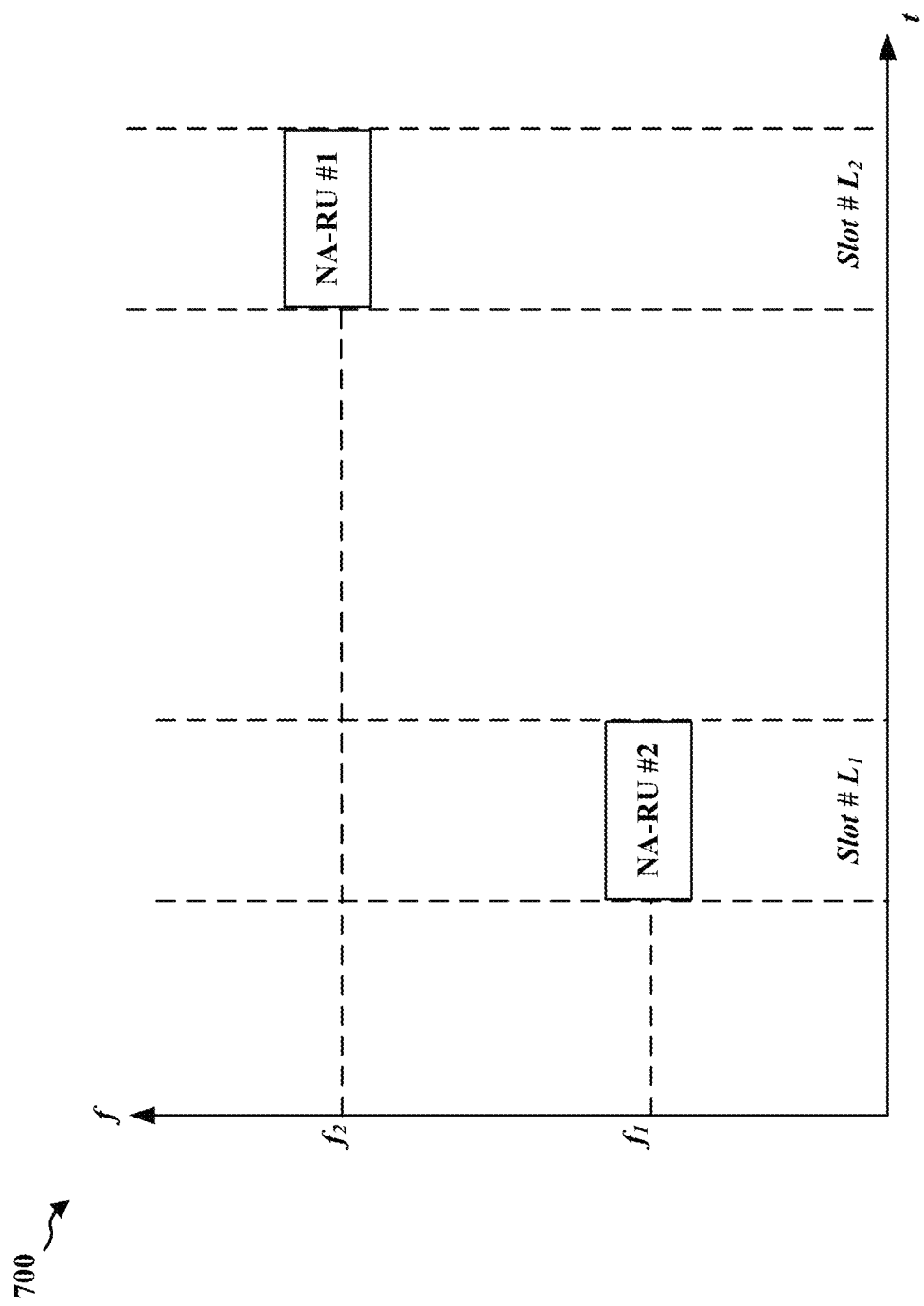
FIG. 7 displays another example of resource allocation according to the present disclosure.

FIG. 7 displays an example of resource allocation 700. In the example in FIG. 7, $\{f_1, f_2, L_1, L_2\}$ may be configurable parameters, which are a function of system bandwidth, the size of NR-RU, and SCS. For example, $f_1$ may provide a center frequency for a first NA-RU and $L_1$ may indicate time resources for the first NA-RU. Similarly, $f_2$ may indicate a center frequency for a second NA-RU, and $L_2$ may indicate time resources for the second NA-RU. The parameters may form a hopping pattern. The hopping pattern of $\{f_1, f_2, L_1, L_2\}$ can be described by a math function or sequence, such as hash function or pseudo-noise (PN) sequence. In some aspects, the NOMA transmissions can define a related offset for the SSB transmission. This offset can be a time variant, as well as based on diversity gain. In this sense, NOMA transmissions can predefine the frequency offset. For example, NOMA transmissions use an index into the Hash function, which provides a location for the NOMA resources relative to the SSB. In some aspects, the SSB transmission can be a starting point for determining the NA-RUs for NOMA communication by the UE.

In another example, a NOMA resource allocation may be indicated based on bitmapping. In some aspects, bitmapping may be used to index the NA-RUs. The bitmapping can help to control a channel element. In one aspect of the present disclosure, the DCI can carry the bitmap or bitmap index. FIG. 8 displays an example of resource allocation 800. FIG. 8 illustrates an example of two NA-RU bitmaps. In some aspects utilizing a bitmap, each bit can have a certain value. For a given bitmap, "0" may indicate that the corresponding NA-RU is not allocated to NOMA UE. Such resources might be assigned to an OMA UE. In the bitmap, "1" may indicate that the corresponding NA-RU is allocated to a group of NOMA UE. Thus, the bitmap may provide an indication showing the UE which NA-RUs are allocated to the group of NOMA UEs and which NA-RUs are allocated to the group of NOMA UEs. The bitmap can be time variant when the NA-RU resource allocation is dynamic. As mentioned above, each NA-RU can be contiguous in a slot, and the UEs can share time and/or frequency locations. All the UEs can monitor the transmission space. Additionally, different UEs can schedule different NA-RU index numbers. For instance, there can be simultaneous uplink NOMA transmissions going to different NA-RUs, so bitmapping can help to allocate these simultaneous transmissions. In some aspects, bitmapping can help to allocate multiple, parallel NOMA transmissions. As such, bitmapping may not require the transmissions to be contiguous.

Figure 9:
FIG. 9 displays another example of resource allocation according to the present disclosure.

FIG. 9 displays an example of resource allocation 900. FIG. 9 displays another example in which a NOMA resource allocation may be indicated based on a starting location and/or a number of NA-RUs. In some aspects, the starting location can be an index or number. This option can be a more compact way to indicate the NOMA resource allocation. As displayed in FIG. 9, the base station may signal a starting location of x for the NA-RU(s) and a number Y of consecutive NA-RUs. In this example, Y NA-RUs can be allocated to the group of NOMA UEs through the indication. Thus, the UE may determine that the index of the allocated NA-RU corresponds to $\{x, x+1, \ldots, x+Y-1\}$.

Figure 10:
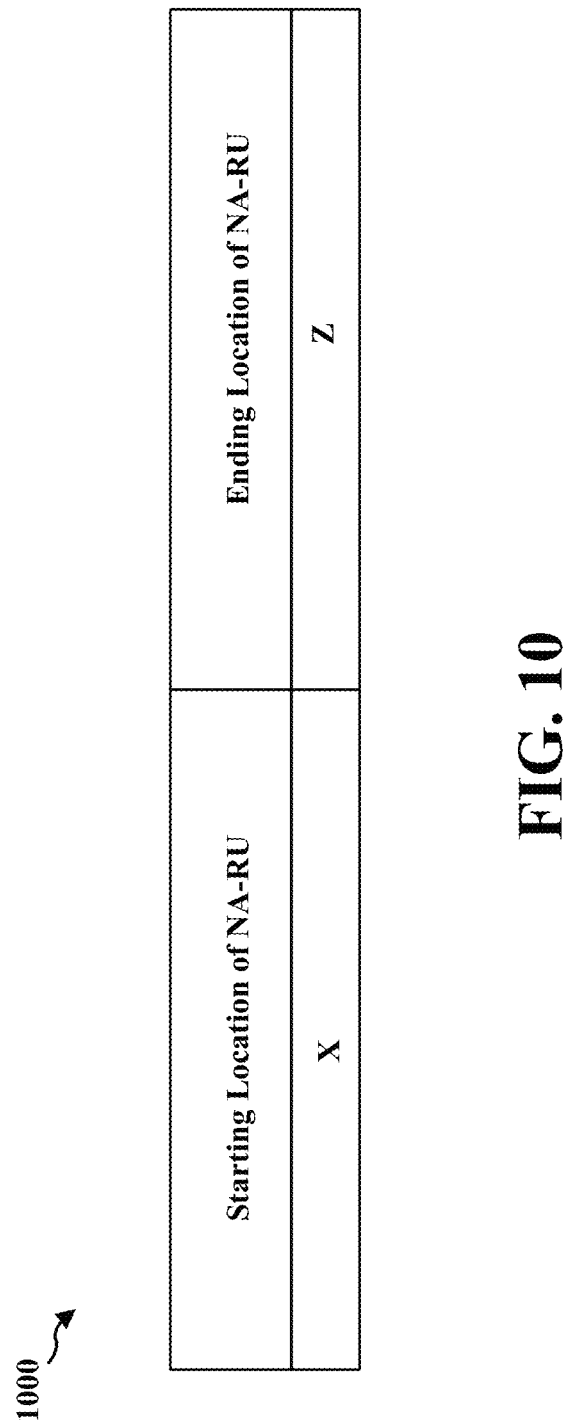
FIG. 10 displays another example of resource allocation according to the present disclosure.

FIG. 10 displays an example of resource allocation 1000. FIG. 10 displays an example wherein the NOMA resource allocation can be indicated based on a starting location and/or an ending location. Like the previous example, this option can also be a compact way to indicate the NOMA resource allocation. As displayed in FIG. 10, the base station may signal a starting location of x for the NA-RU(s) and an ending location of z for the NA-RU(s). Thus, (z-x+1) NA-RUs can be allocated to a group of NOMA UEs through the indication. Based on the indication, the UE may determine that index of the allocated NA-RU is given by $\{x, x+1, \ldots, z\}$. The two options displayed in FIGS. 9 and 10 can be used interchangeably with one another, as they both utilize starting locations. Accordingly, different options can be utilized to indicate the resource allocation for NOMA transmissions. For instance, the PRB pairs can be grouped on a grid, as well as index the PRB pairs into an NA-RU number.

In some aspects, NOMA transmission herein can include additional communication methods. More specifically, NOMA transmissions herein may include random access channel (RACH) communication method. One example of NOMA communication may be a two-step RACH. Further, a communication messages between multiple UEs may use similar RACH resources. For example, a first message between multiple UEs may include a preamble and data, such that the multiple UEs are using the same random access resources. In some aspects, NOMA communication may utilize a number of different channels, such as a PUSCH. Additionally, NOMA communication may utilize HARQ, such as in response to certain channel communication, e.g., PUSCH.

Figure 11:
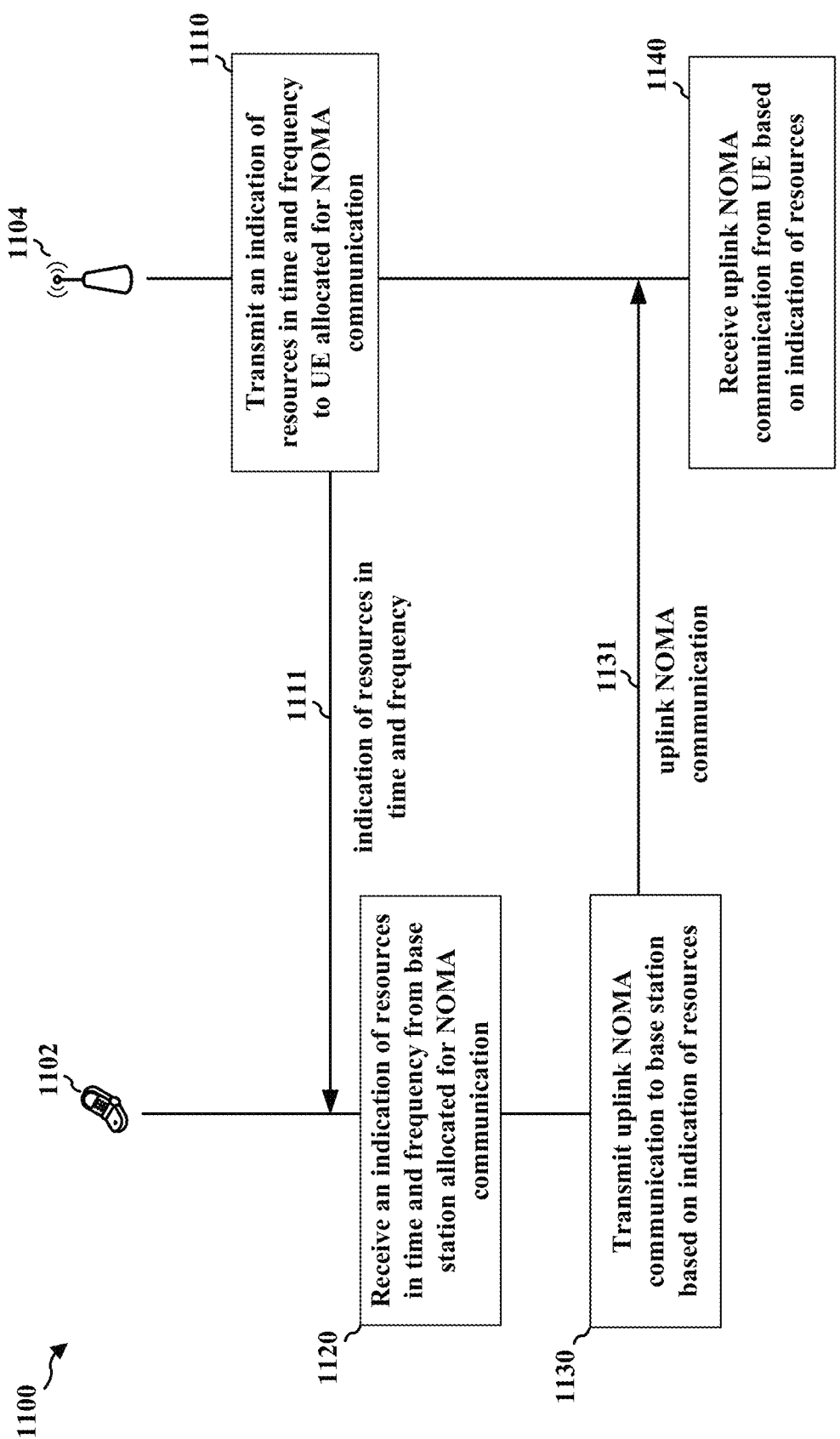
FIG. 11 is a diagram illustrating transmissions between a base station and a UE.

FIG. 11 is a diagram 1100 illustrating transmissions between base station 1104 and UE 1102. For instance, base station 1104 can, at 1110, transmit an indication of resources in time and frequency 1111 to UE 1102 allocated for NOMA communication based on NA-RUs. The indication of resources can comprise a set of NA-RUs. At 1120, UE 1102 receives the indication of resources in time and frequency from base station 1104. The indication of the resources can be based on a NOMA raster of candidate locations for the NA-RUs, e.g., as described in connection with the example in FIG. 6. Additionally, the set of NA-RUs can be mapped to the time frequency resource grid with respect to the SSB based on a predefined function, e.g., as described in connection with the example of FIG. 7. The predefined function may specify the center frequency of NA-RUs, the subcarrier spacing used, or the number of PRBs within each NA-RU.

Moreover, the indication of resources can be based on a bitmap for the set of the NA-RUs, as described in connection with the example in FIG. 8. The indication can also comprise a starting location of the set of the NA-RUs and/or a number of the NA-RUs comprised in the set, as described in connection with the example in FIG. 9. Further, the indication can comprise a starting location of the set of the NA-RUs and/or an ending location of the set of the NA-RUs, as described in connection with the example in FIG. 10. The set of the NA-RUs can comprise a number of NA-RUs that are contiguous in time or frequency, as illustrated in the example in FIG. 5A. The set of the NA-RUs can be interlaced in time and/or frequency within a resource grid, as illustrated in the examples in FIGS. 5A and 5B. The resource grid may span the entire system bandwidth in frequency and the entire slot in time, and the slot index for NR-RU can be semi-static or dynamically configured. Also, the uplink NOMA communication can be received from the UE, and multiple UEs may share the same NR-RUs in time and frequency domain.

At 1130, UE 1102 can also transmit uplink NOMA communication 1131 to base station 1104 based on the indication of resources. Finally, at 1140, base station 1104 can receive uplink NOMA communication from the UE based on the indication of resources.

FIG. 12 is a flowchart 1200 of a method of wireless communication. The method may be performed by a UE (e.g., UE 104, 182, 350, 404, 1102, apparatus 1302; the processing system 1414, which may include memory 1406 and which may be the entire UE 350 or a component of the UE 350, such as the TX processor 368, the RX processor 356, and/or the controller/processor 359) communicating with a base station (e.g., base station 102, 180, 310, 402, 1104, apparatus 1602). Optional aspects are illustrated with a dashed line. The methods described herein can provide a number of benefits, such as improving power savings and/or resource utilization.

At 1202, the UE can receive an indication of resources in time and/or frequency from a base station allocated for NOMA communication with the UE. For example, reception component 1304 of apparatus 1302 may receive an indication of resources in time and/or frequency from a base station allocated for NOMA communication. The indication of resources can comprise a set of NA-RUs. As mentioned above, the indication of the resources can be based on a NOMA raster of candidate locations for the NA-RUs, as described in connection with the example in FIG. 6. The set of NA-RUs can also be mapped to the time frequency resource grid with respect to the SSB based on a predefined function, as described in connection with the example in FIG. 7. The function may specify the center frequency of NA-RUs, the subcarrier spacing used, and/or the number of PRBs within each NA-RU.

Additionally, the indication of resources can be based on a bitmap for the set of the NA-RUs, as described in connection with the example in FIG. 8. The indication can also comprise a starting location of the set of the NA-RUs and/or a number of the NA-RUs comprised in the set, as described in connection with the example in FIG. 9. Moreover, the indication can comprise a starting location of the set of the NA-RUs and/or an ending location of the set of the NA-RUs, as described in connection with the example in FIG. 10. The set of the NA-RUs can comprise a number of NA-RUs that are contiguous in time or frequency, as illustrated in the example in FIG. 5A. The set of the NA-RUs can be interlaced in time and/or frequency within a resource grid, as illustrated in the examples in FIGS. 5A and 5B. The resource grid may span the entire system bandwidth in frequency and the entire slot in time. A slot index for NR-RU can be semi-static or dynamically configured by the base station. Also, the uplink NOMA communication can be received from the UE, and multiple UEs may share the same NA-RUs in time and frequency domain.

In addition, at 1204, the UE can transmit uplink NOMA communication to the base station based on the indication of resources, e.g., using at least one of the indicated NA-RUs allocated to a group of NOMA UEs including the UE. For example, transmission component 1306 of apparatus 1302 may transmit uplink NOMA communication to the base station based on the indication of resources.

Figure 13:
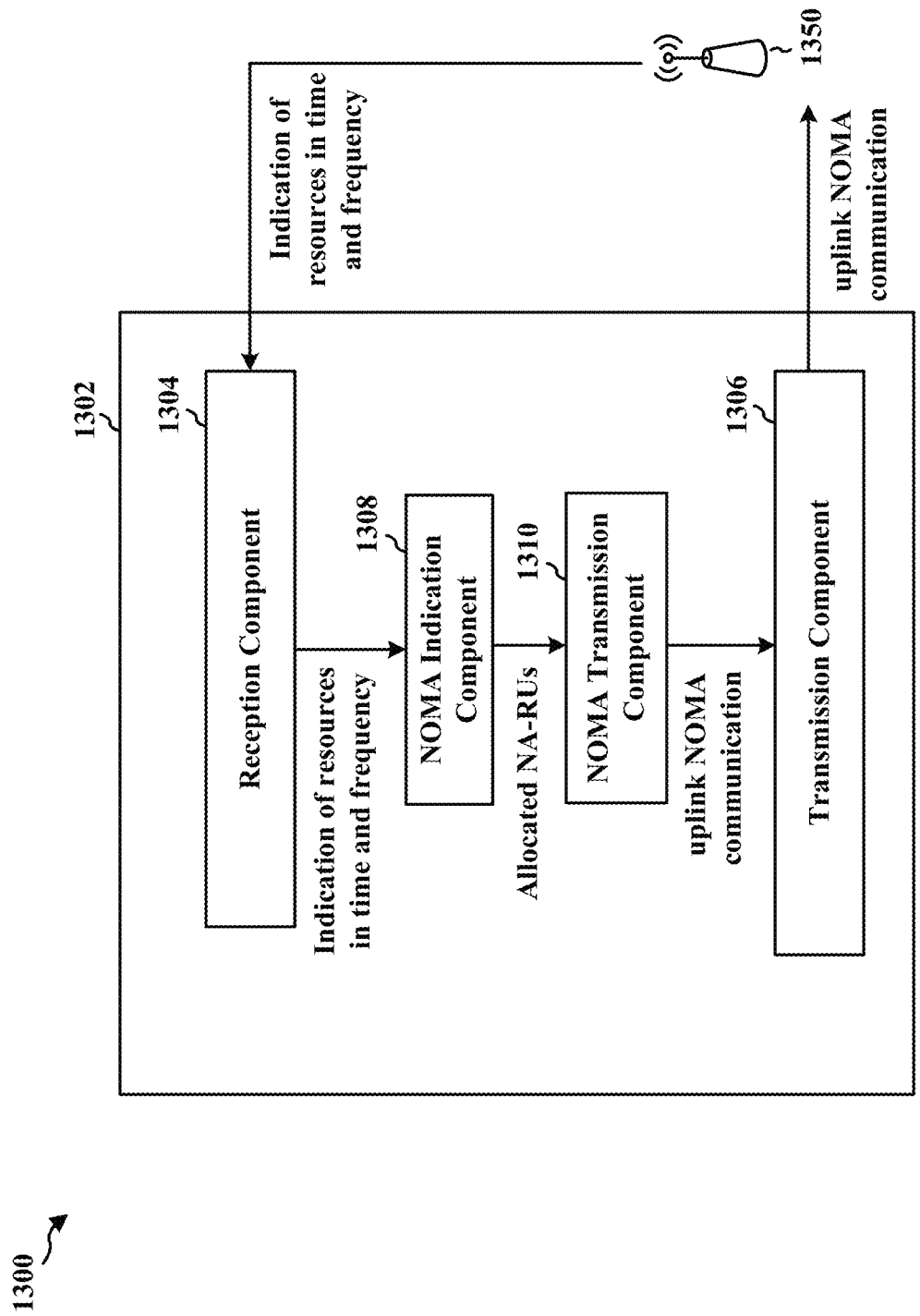
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE or a component of a UE. The apparatus includes a reception component 1304 that is configured to receive downlink communication from base station 1350 and a transmission component 1306 configured to transmit uplink communication to the base station 1350. The apparatus further includes a NOMA indication component 1308 that is configured to receive, e.g., via reception component 1304, an indication of resources in time and frequency from a base station allocated for NOMA communication with the UE. The indication of resources can comprise a set of NA-RUs. The apparatus can also include a NOMA transmission component 1310 that is configured to transmit uplink NOMA communication to the base station based on the indication of resources.

The apparatus may include additional components that perform each of the blocks of the algorithm in the aforementioned flowcharts of FIGS. 11 and 12. As such, each block in the aforementioned flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
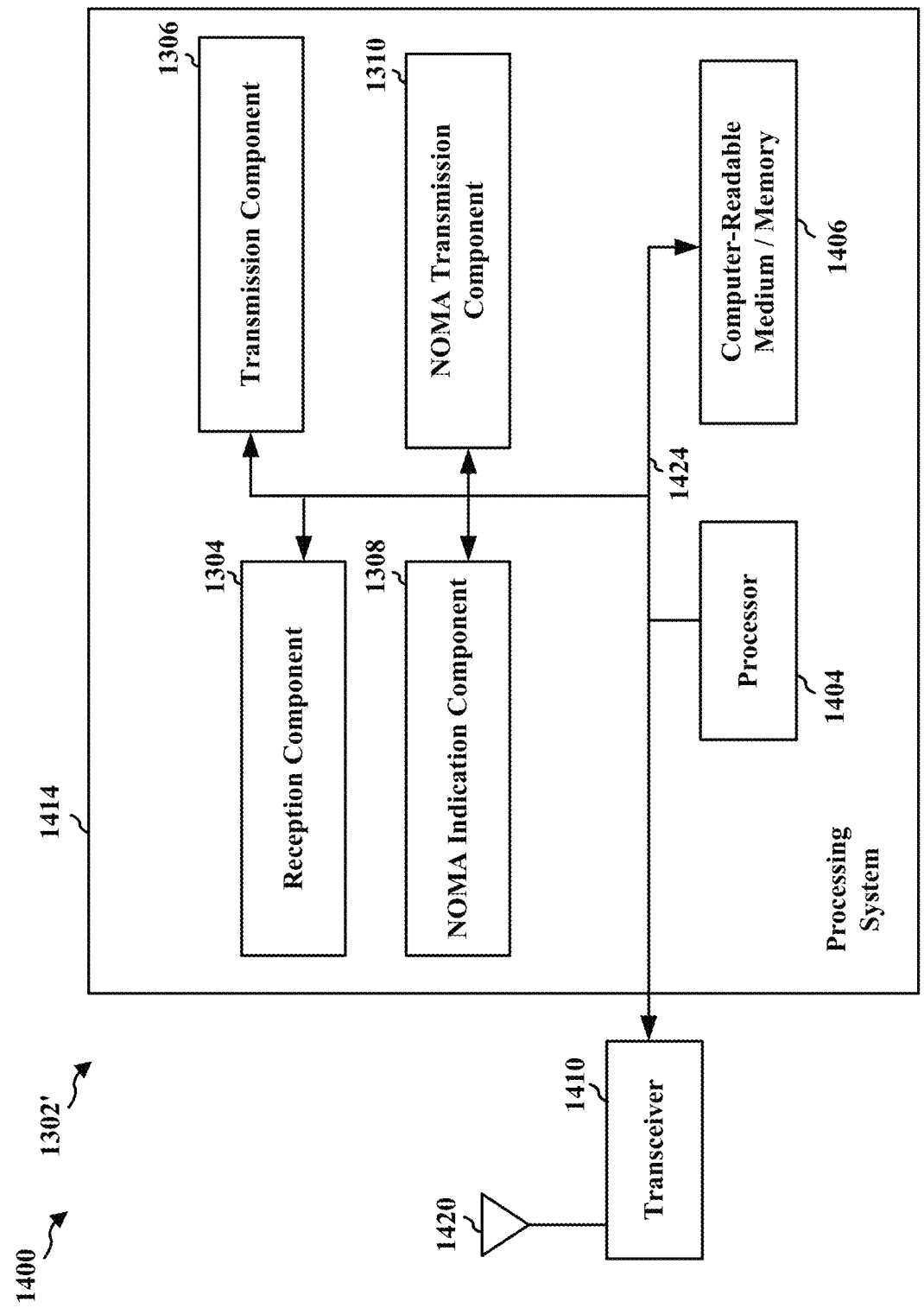
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359. Alternately, the processing system 1414 may comprise the entire UE, e.g., UE 350.

In one configuration, the apparatus 1302/1302' for wireless communication includes means for receiving an indication of resources in time and frequency from a base station allocated for NOMA communication with the base station. The indication of resources can comprise a set of NA-RUs. The apparatus can also include means for transmitting uplink NOMA communication to the base station based on the indication of resources received from the base station. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
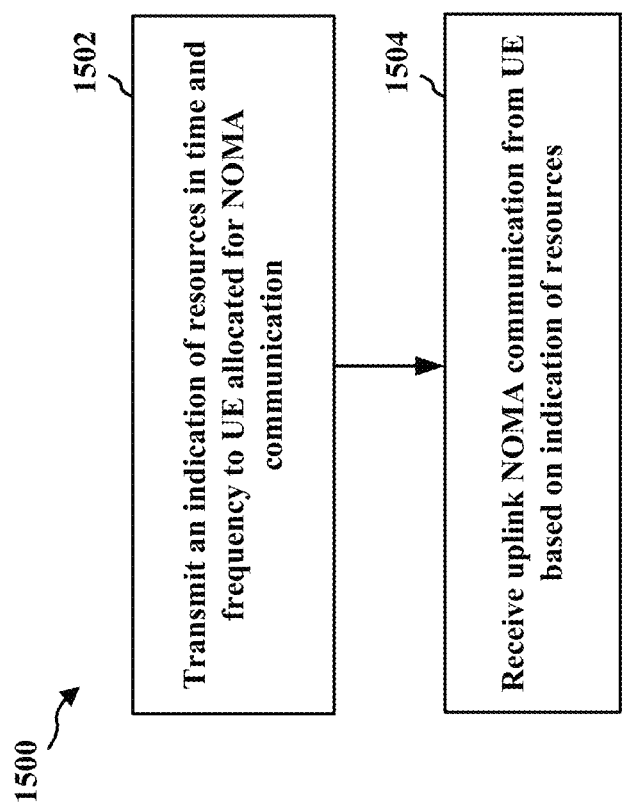
FIG. 15 is a flowchart of a method of wireless communication.

FIG. 15 is a flowchart 1500 of a method of wireless communication. The method may be performed by a base station (e.g., base station 102, 180, 310, 402, 1104, apparatus 1602; the processing system 1714, which may include memory 376 and which may be the entire base station 310 or a component of a base station, such as the TX processor 316, the RX processor 370, and/or the controller/processor 375) communicating with a UE (e.g., UE 104, 182, 350, 404, 1102, apparatus 1302). Optional aspects are illustrated with a dashed line. The methods described herein can provide a number of benefits, such as improving power savings and/or resource utilization.

At 1502, the base station can transmit an indication of resources in time and frequency to a UE allocated for NOMA communication with the base station. For example, transmission component 1606 of apparatus 1602 may transmit an indication of resources in time and frequency to a UE allocated for NOMA communication. The indication of resources can comprise a set of NA-RUs. As mentioned above, the indication of the resources can be based on a NOMA raster of candidate locations for the NA-RUs, as described in connection with the example in FIG. 6. The set of NA-RUs can also be mapped to the time frequency resource grid with respect to the SSB based on a predefined function, as described in connection with the example in FIG. 7. The function may specify the center frequency of NA-RUs, the subcarrier spacing used, and/or the number of PRBs within each NA-RU.

Further, the indication of resources can be based on a bitmap for the set of the NA-RUs, as described in connection with the example in FIG. 8. The indication can also comprise a starting location of the set of the NA-RUs and/or a number of the NA-RUs comprised in the set, as described in connection with the example in FIG. 9. Also, the indication can comprise a starting location of the set of the NA-RUs and an ending location of the set of the NA-RUs, as described in connection with the example in FIG. 10. The set of the NA-RUs can comprise a number of NA-RUs that are contiguous in time or frequency, as illustrated in the example in FIG. 5A. The set of the NA-RUs can be interlaced in time or frequency within a resource grid, as illustrated in the examples in FIGS. 5A and 5B. The resource grid may span the entire system bandwidth in frequency and the entire slot in time, and the slot index for NR-RU can be semi-static or dynamically configured. The uplink NOMA communication can be received from the UE, and multiple UEs share the same NR-RUs in time and frequency domain.

Finally, at 1504, the base station can receive uplink NOMA communication from the UE based on the indication of resources. For example, reception component 1604 of apparatus 1602 may receive uplink NOMA communication from the UE based on the indication of resources.

Figure 16:
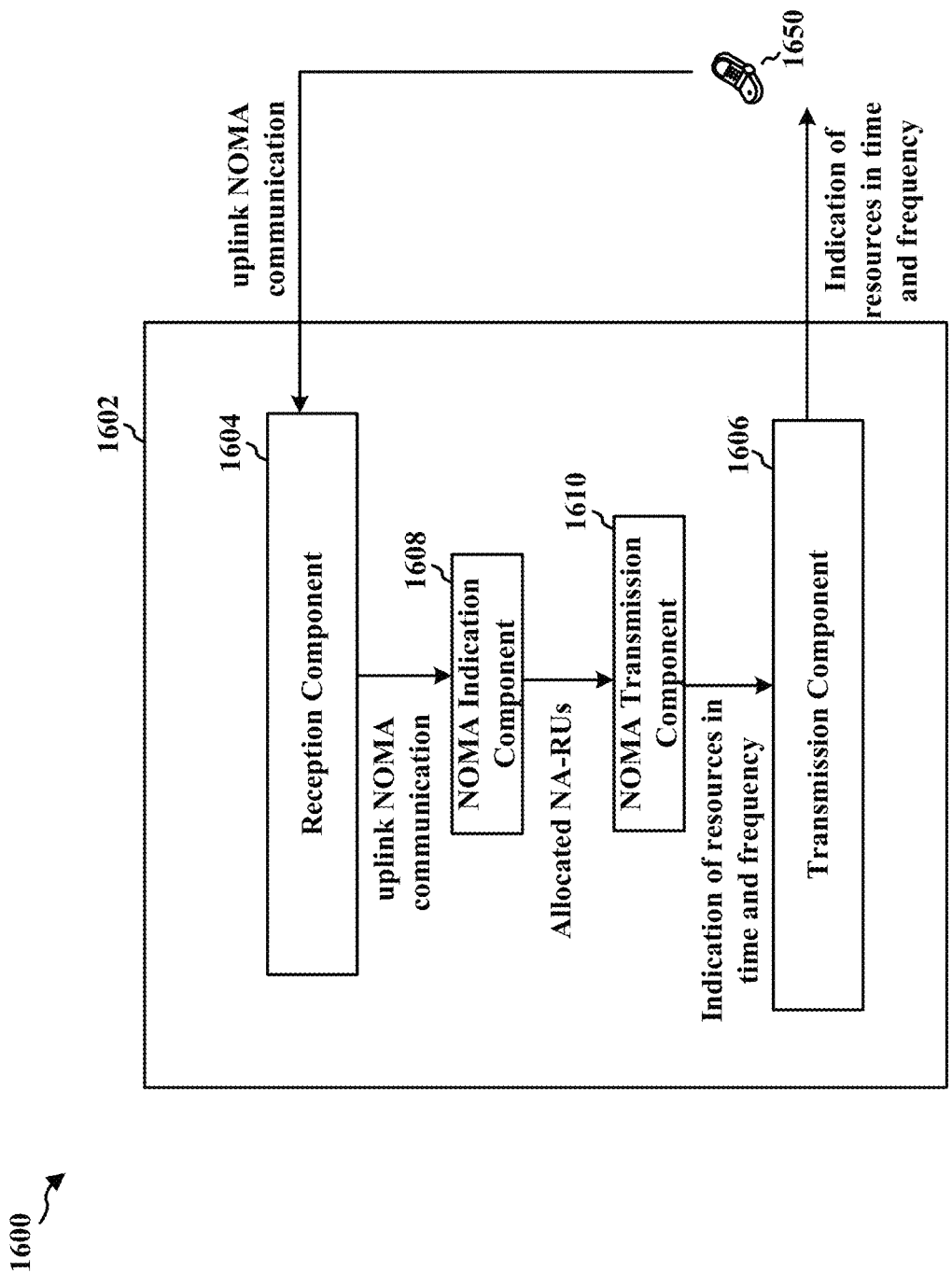
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a base station or a component of a base station. The apparatus includes a transmission component 1606 that is configured to transmit an indication of resources to the UE 1650. The apparatus further includes NOMA transmission component 1610 that is configured to transmit, e.g., via transmission component 1604, an indication of resources in time and frequency to UE 1650 allocated for NOMA communication with the base station. The indication of resources can comprise a set of NA-RUs. The apparatus can also include a reception component 1604 that is configured to receive uplink communication from UE 1350. The apparatus can further include NOMA indication component 1608 that is configured to receive, e.g., via reception component 1604 uplink NOMA communication from the UE based on the indication of resources.

The apparatus may include additional components that perform each of the blocks of the algorithm in the aforementioned flowcharts of FIGS. 11 and 15. As such, each block in the aforementioned flowcharts of FIGS. 11 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
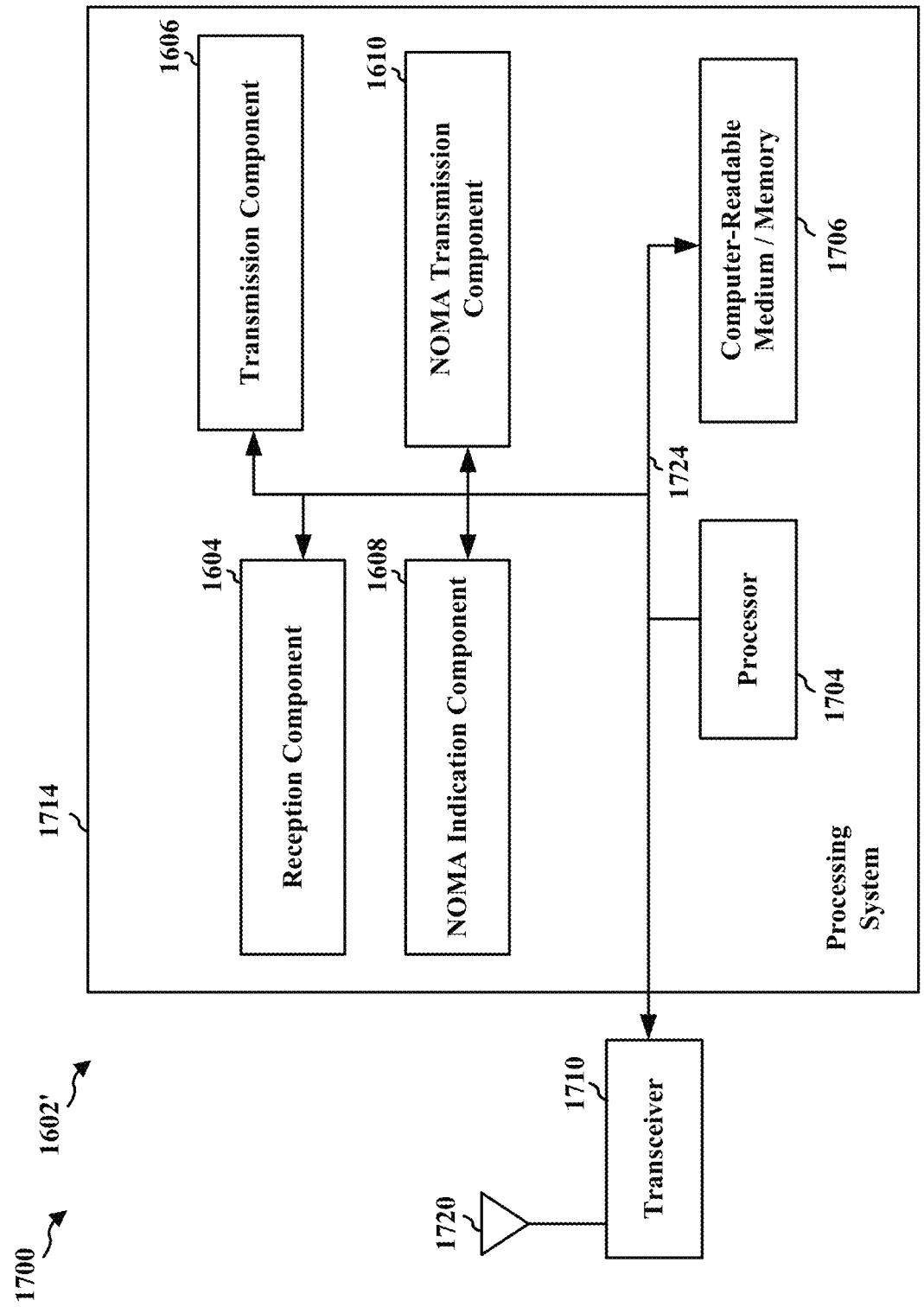
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1606. In addition, the transceiver 1710 receives information from the processing system 1714, specifically the transmission component 1604, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610. The components may be software components running in the processor 1704, resident/stored in the computer readable medium/memory 1706, one or more hardware components coupled to the processor 1704, or some combination thereof. The processing system 1714 may be a component of the base station 310 and may include the memory 376 and/or at least one of the TX processor 316, the RX processor 370, and the controller/processor 375. Alternately, the processing system 1714 may comprise the entire base station, e.g., base station 310.

In one configuration, the apparatus 1602/1602' for wireless communication includes means for transmitting an indication of resources in time and frequency to a UE allocated for NOMA communication with the UE. The indication of resources can comprise a set of NA-RUs. The apparatus can also include means for receiving uplink NOMA communication from the UE based on the indication of resources transmitted to the UE. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In addition to, or alternatively to, the aspects described in connection with FIGS. 5A-11, the present disclosure may reduce signaling overhead by compacting the DCI for NOMA communication and/or by utilizing a compressed form of configured grant for NOMA communication. In some aspects, a configured grant transmission can use an RRC configuration rather than in dynamic DCI in the PDCCH.

Additionally, a group RNTI for a group of NOMA UEs can be introduced. Thus, the RNTI may not be UE-specific, but rather group-specific and common to all NOMA UEs within a group. The group of NOMA UEs may share the same NA-RUs. Some aspects can also use a group RNTI to scramble or mask part of the CRC. As mentioned herein, NOMA transmissions can share time and frequency resources. Along these lines, most NOMA transmission schemes can share a common feature. For example, when using a scrambling based NOMA transmission, the scrambling length can be the same for all NOMA transmissions. These common features of NOMA transmissions can provide a basis for the compact signaling.

Figure 18:
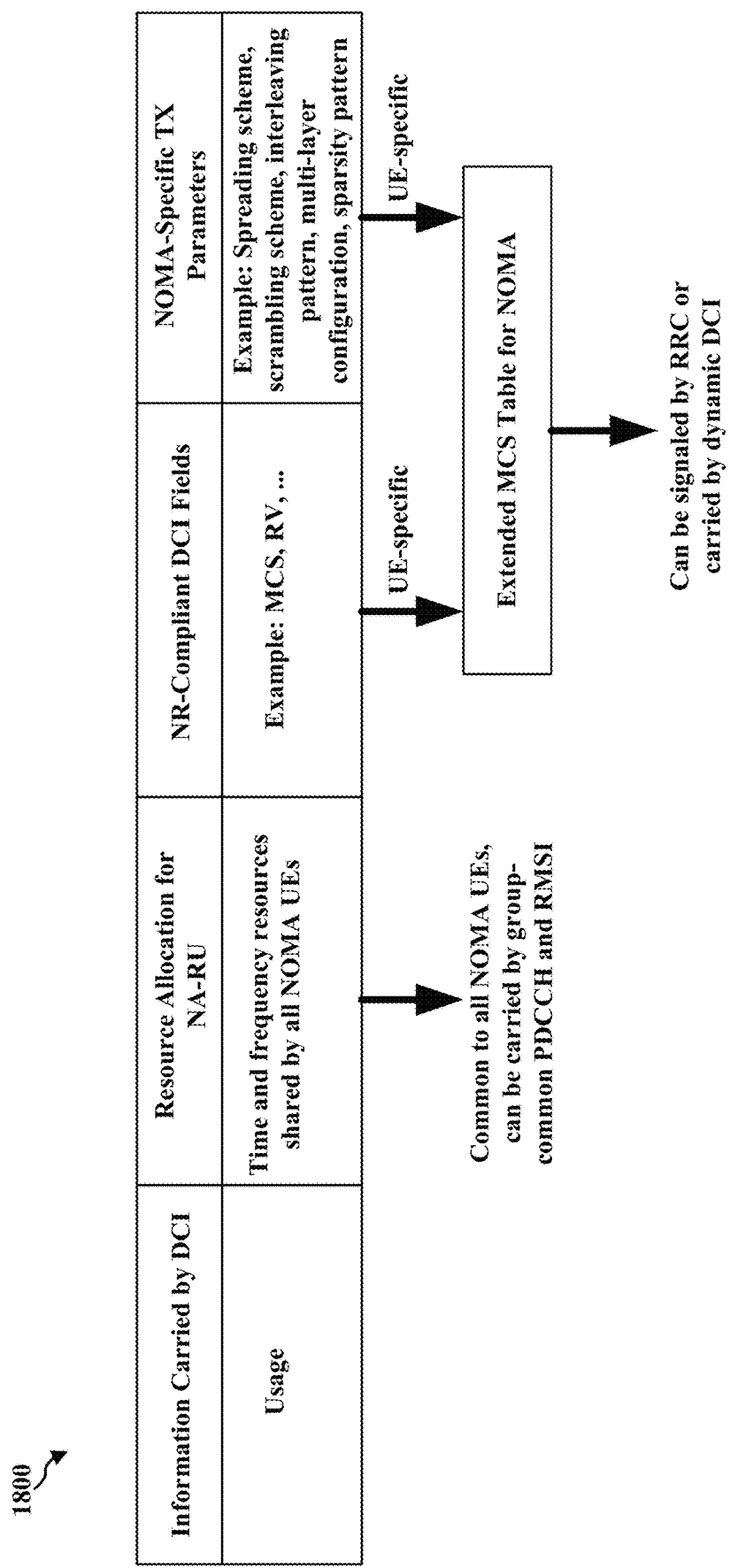
FIG. 18 displays one example of a signaling scheme according to the present disclosure.

FIG. 18 displays an example of a signaling scheme 1800. FIG. 18 displays one example of compacting the DCI that can be supported in NOMA transmissions in the present disclosure in order to reduce the signaling overhead of dynamic DCI. In one aspect, a group common PDCCH can be reused. As shown in FIG. 18, the RMSI for a common resource allocation can be reused. The CRC for the group common PDCCH and/or RMSI for common resource allocation can be scrambled by NOMA group RNTI. In some aspects, a group common PDCCH can be used, so each UE in the cell can monitor the search space for the PDCCH. Additionally, in some aspects the payload size of the group common PDCCH can be limited, so the common or shared resources can be used in order to keep the payload size low. A multi-cast or broadcast signal may be used to carry the common resource allocation. Accordingly, some aspects can consider a group common PDCCH for the common resource allocation. In other aspects, the PDCCH and RMSI can be payload based, and the CRC for both the PDCCH and RMSI can be scrambled by the NOMA group RNTI.

In another aspect, a modified DCI format may be used for NOMA, in addition to a MCS table comprising NOMA specific transmission parameters. As shown in FIG. 18, NOMA specific transmission parameters can be included with the MCS table entries. For instance, these NOMA specific transmission parameters can include any of a spreading factor, a seed of scrambling code, and layers for multi-branch transmission. Some entries of the new MCS table can be customized for NOMA specific transmission parameters. For example, the MCS table can include an entry for a spreading factor, a seed of scrambling code, or layers for multi-branch transmission.

In yet another aspect, a multi-stage DCI scrambled by a NOMA group RNTI may be used. In some aspects, the system bandwidth can be wide, so that the system bandwidth can accommodate both NOMA and OMA transmissions. A common subspace may be used to carry the NOMA specific group common PDCCH. The subspace can be monitored, whether using OMA or NOMA UEs. From power savings perspective, these types of transmissions can be used with NOMA UEs, as OMA UEs may not have a grant. Additionally, these transmissions can be performed in multiple steps. Further, this can enable power savings for OMA UEs, as once OMA UEs detect the first stage DCI, then the wireless system can stop the signal processing and save power. A NOMA UE that is able to decode the first stage of the DCI based on the NOMA group RNTI, will continue to receive and decode the additional stages of the multi-stage DCI.

In another aspect of the present disclosure, in order to reduce the payload size of a configured grant for the first transmissions and HARQ re-transmissions, a compressed form of a configured grant can be supported. In some aspects, configured grant or grant-free transmissions can be carried by RRC and choose the first transmission. As mentioned above, in NOMA transmissions, the first transmission and the re-transmissions can be configured. Accordingly, the configured grant can cover the first transmission and any re-transmissions. The grant to the UE may reference a table of transport formats applicable to NOMA. For example, the UE may use a new lookup table to identify the transport format for the UE from the grant. A lookup table may be built between the first and re-transmission, e.g., in order to simplify the signaling. For example, if a pre-configuration includes a first transmission using a certain spreading factor and a re-transmission using a larger spreading factor, aspects presented herein can simplify this process through use of a lookup table. Further, some aspects can use a bit in the RRC payload to identify whether the transmissions are activated or deactivated.

In another aspect, a compressed form of configured grant can utilize an index or number the transport formats available to different NOMA schemes. For instance, the possible combinations for the first transmission and re-transmissions can be enumerated. For example, an MCS or NOMA specific transmission scheme can have a table to list the possible combinations. The grant to the UE may comprise and index, and the UE can use an index to identify the corresponding transport format. Additionally, a compressed form of configured grant can select one or a subset of transport formats, and transmit the index in the payload of RRC signaling. In some aspects, the index can be of the corresponding transport format. As such, in these aspects, the index can be transmitted, not the details the payload of RRC signaling. As the index may need to be transmitted to the UE in the grant, this is an efficient way to signal the information for the first and re-transmissions.

Figure 19:
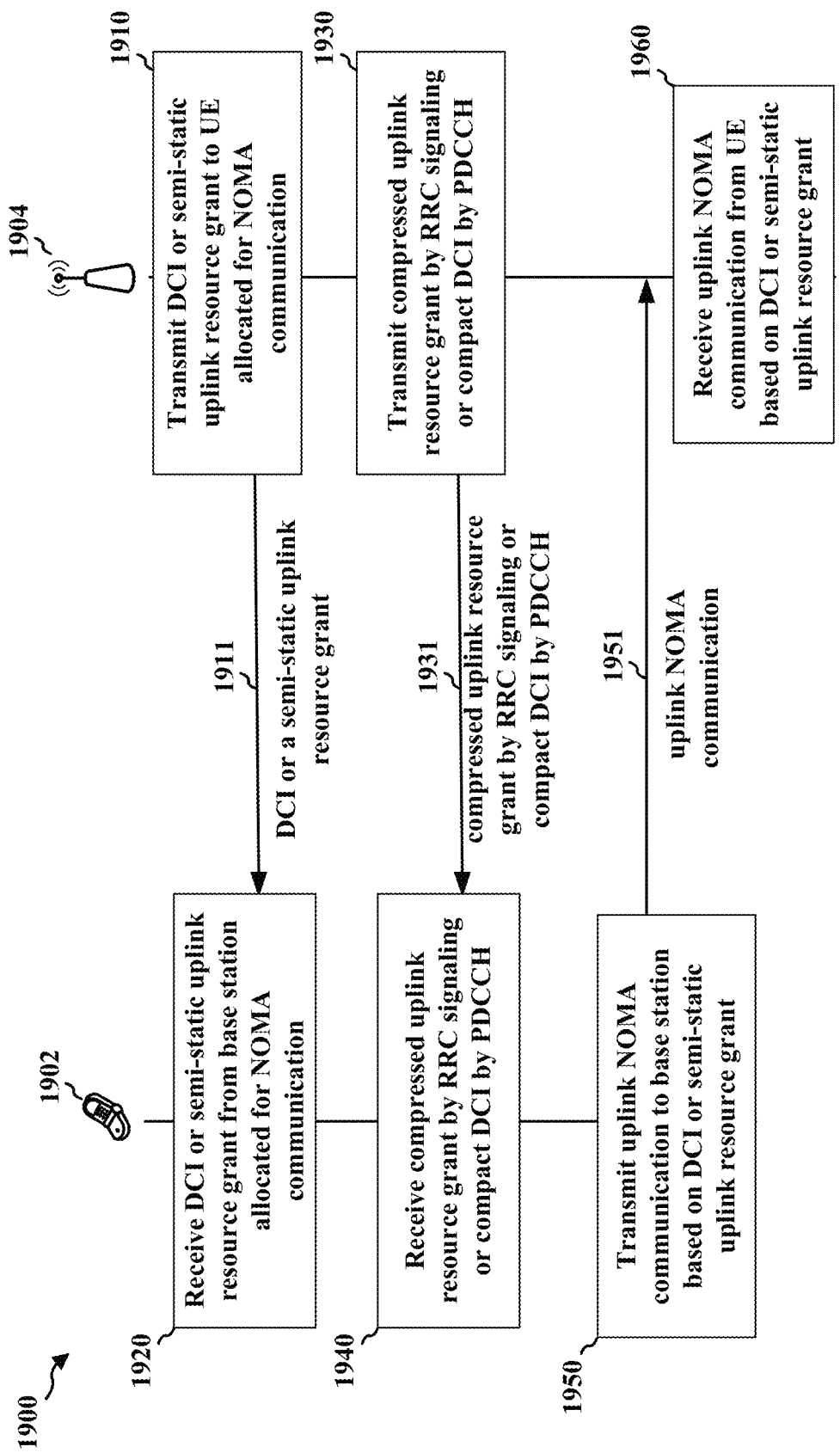
FIG. 19 is a diagram illustrating transmissions between a base station and a UE.

FIG. 19 is a diagram 1900 illustrating transmissions between base station 1904 and UE 1902. For instance, base station 1904 can transmit 1910 DCI or a semi-static uplink resource grant 1911 to UE 1902 allocated for NOMA communication. A payload of the DCI or the semi-static uplink resource grant can be scrambled with a NOMA group RNTI or comprise NOMA transmission parameters indicated by an extended MCS table. UE 1902 can receive 1920 the DCI or semi-static uplink resource grant from base station 1904 allocated for NOMA communication.

The DCI can be received based on at least one of a group common control channel or RMSI for a common resource allocation. The DCI may also comprise a CRC that is scrambled by the NOMA group RNTI. Additionally, the DCI can comprise one or more NOMA transmission parameters indicated by the extended MCS table, as described in connection with the example in FIG. 18. The one or more NOMA transmission parameters can comprise at least one of a spreading factor for a NOMA transmission, a seed of scrambling code for the NOMA transmission, and one or more layers for multiple branch transmission of the NOMA transmission, as mentioned above in connection with the example in FIG. 18. The DCI can also comprise a multiple stage DCI scrambled by the NOMA group RNTI.

Base station 1904 can also transmit 1930 a compressed uplink resource grant by RRC signaling or a compact DCI by PDCCH 1931. In turn, UE 1902 can receive 1940 the compressed uplink resource grant by RRC signaling or compact DCI by PDCCH. The compressed uplink resource grant can be based on a table of NOMA transport formats. Also, the compressed uplink resource grant can indicate an index for a transport format from among multiple transport formats for the uplink NOMA communication. Further, the compressed uplink resource grant can comprise an index of at least one transport format that is received through RRC signaling.

UE 1902 can also transmit 1950 uplink NOMA communication 1951 to the base station based on DCI or a semi-static uplink resource grant. Finally, base station 1904 can receive 1960 uplink NOMA communication from the UE based on the DCI or semi-static uplink resource grant.

Figure 20:
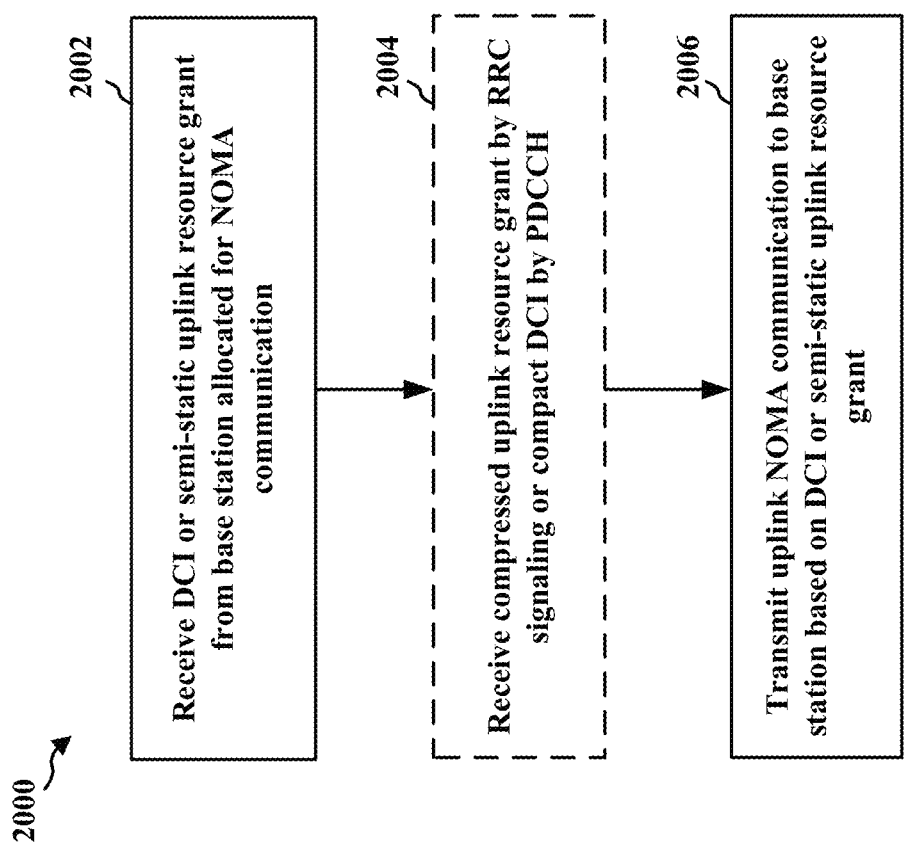
FIG. 20 is a flowchart of a method of wireless communication.

FIG. 20 is a flowchart 2000 of a method of wireless communication. The method may be performed by a UE (e.g., UE 104, 182, 350, 404, 1902, apparatus 2102; the processing system 2214, which may include memory 2206 and which may be the entire UE 350 or a component of the UE 350, such as the TX processor 368, the RX processor 356, and/or the controller/processor 359) communicating with a base station (e.g., base station 102, 180, 310, 402, 1904, apparatus 2402). Optional aspects are illustrated with a dashed line. The methods described herein can provide a number of benefits, such as improving power savings and/or resource utilization.

At 2002, the UE can receive DCI or semi-static uplink resource grant from the base station allocated for NOMA communication. For example, reception component 2104 of apparatus 2102 may receive DCI or semi-static uplink resource grant from the base station allocated for NOMA communication. A payload of the DCI or the semi-static uplink resource grant can be scrambled with a NOMA group RNTI or comprise NOMA transmission parameters indicated by an extended MCS table, as described in connection with the example in FIG. 18. The DCI can be received based on at least one of a group common control channel or RMSI for a common resource allocation. The DCI also comprise a CRC that is scrambled by the NOMA group RNTI. Further, the DCI can comprise one or more NOMA transmission parameters indicated by the extended MCS table. The one or more NOMA transmission parameters can comprise at least one of a spreading factor for a NOMA transmission, a seed of scrambling code for the NOMA transmission, and one or more layers for multiple branch transmission of the NOMA transmission, as mentioned above in connection with the example in FIG. 18. The DCI can also comprise a multiple stage DCI scrambled by the NOMA group RNTI.

At 2004, the UE can receive the compressed uplink resource grant by RRC signaling or compact DCI by PDCCH. For example, reception component 2104 of apparatus 2102 may receive the compressed uplink resource grant by RRC signaling or compact DCI by PDCCH. The compressed uplink resource grant can be based on a table of NOMA transport formats. Also, the compressed uplink resource grant can indicate an index for a transport format from among multiple transport formats for the uplink NOMA communication. The compressed uplink resource grant can comprise an index of at least one transport format that is received through RRC signaling.

Finally, at 2006, the UE can transmit uplink NOMA communication to the base station based on DCI or a semi-static uplink resource grant. For example, transmission component 2106 of apparatus 2102 may transmit uplink NOMA communication to the base station based on DCI or a semi-static uplink resource grant.

Figure 21:
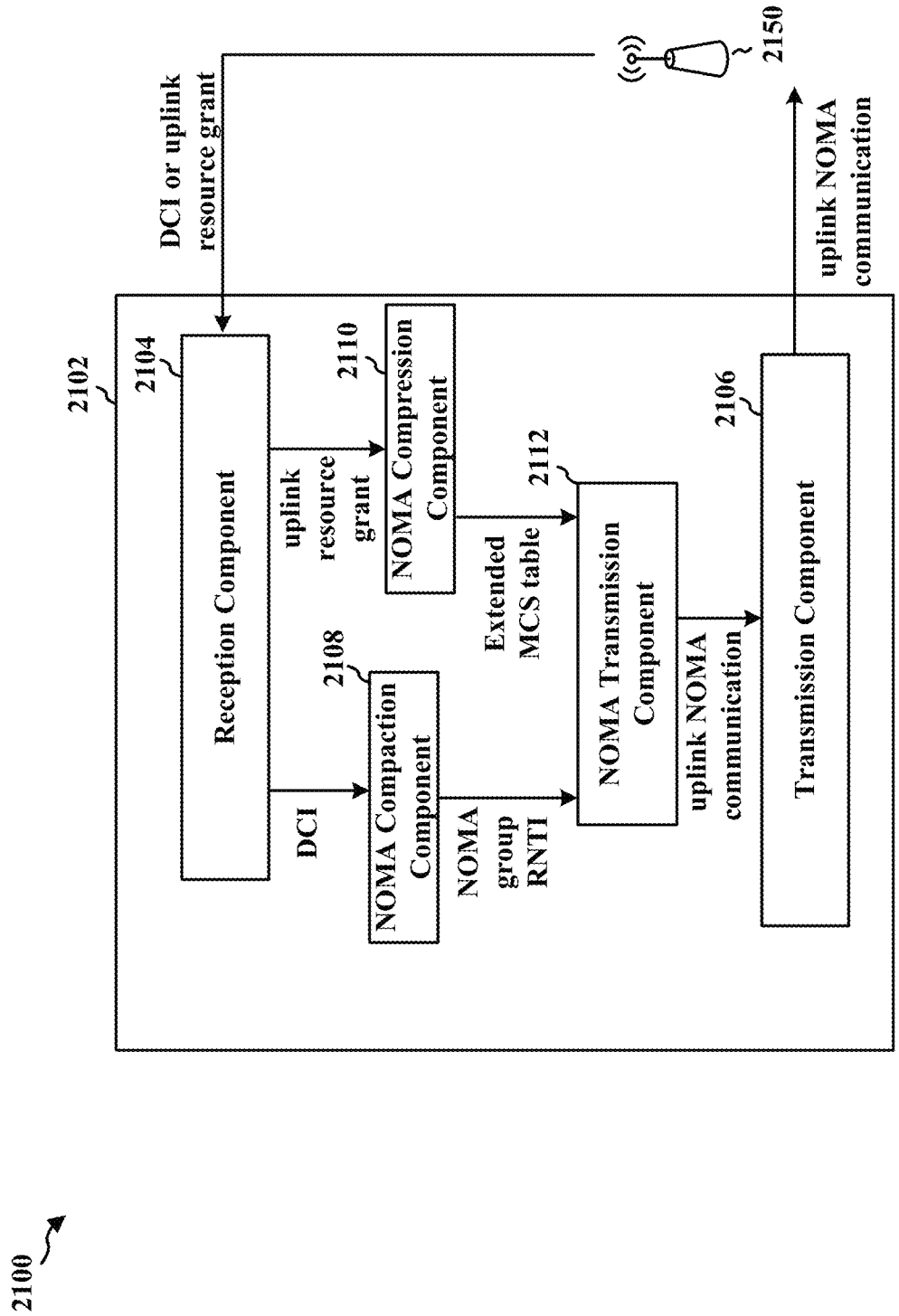
FIG. 21 is a conceptual data flow diagram illustrating the data flow between different means/components in an exemplary apparatus.

FIG. 21 is a conceptual data flow diagram 2100 illustrating the data flow between different means/components in an exemplary apparatus 2102. The apparatus may be a UE or a component of a UE. The apparatus can include a reception component 2104 that is configured to receive DCI or semi-static uplink resource grant from a base station allocated for NOMA communication. NOMA compression component 2110 can also be configured to receive compressed uplink resource grant by RRC signaling. NOMA compaction component 2108 can be configured to receive compact DCI by PDCCH. The apparatus can also include a transmission component 2106 that is configured to transmit uplink communication to base station 2150. The apparatus can also include a NOMA transmission component 2112 that is configured to transmit uplink NOMA communication to base station based on DCI or semi-static uplink resource grant.

The apparatus may include additional components that perform each of the blocks of the algorithm in the aforementioned flowcharts of FIGS. 19 and 20. As such, each block in the aforementioned flowcharts of FIGS. 19 and 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
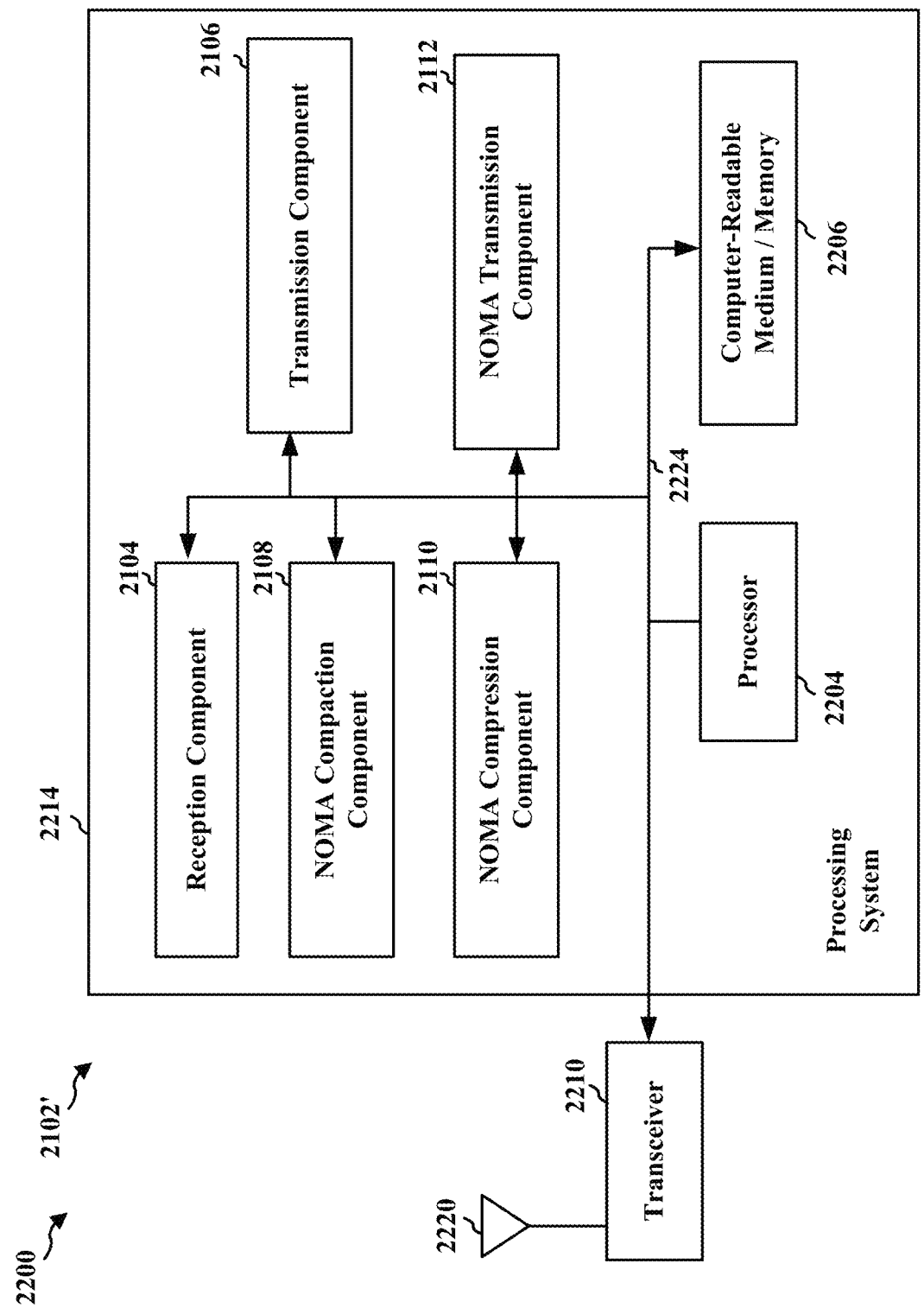
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, 2112, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2106, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108, 2110, 2112. The components may be software components running in the processor 2204, resident/stored in the computer readable medium/memory 2206, one or more hardware components coupled to the processor 2204, or some combination thereof. The processing system 2214 may be a component of the UE 350 and may include the memory 360 and/or at least one of the TX processor 368, the RX processor 356, and the controller/processor 359. Alternatively, the processing system 2214 may comprise the entire UE, e.g., UE 350.

In one configuration, the apparatus 2102/2102' for wireless communication includes means for receiving DCI or a semi-static uplink resource grant from a base station allocated for NOMA communication with the base station. The DCI can be scrambled with a NOMA group RNTI or comprises NOMA transmission parameters indicated by an extended MCS table. The apparatus can also include means for receiving a compact DCI signaled by PDCCH or a compressed uplink resource grant signaled by a RRC. The apparatus can also include means for transmitting uplink NOMA communication to the base station based on the DCI or a semi-static uplink resource grant received from the base station. The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 23:
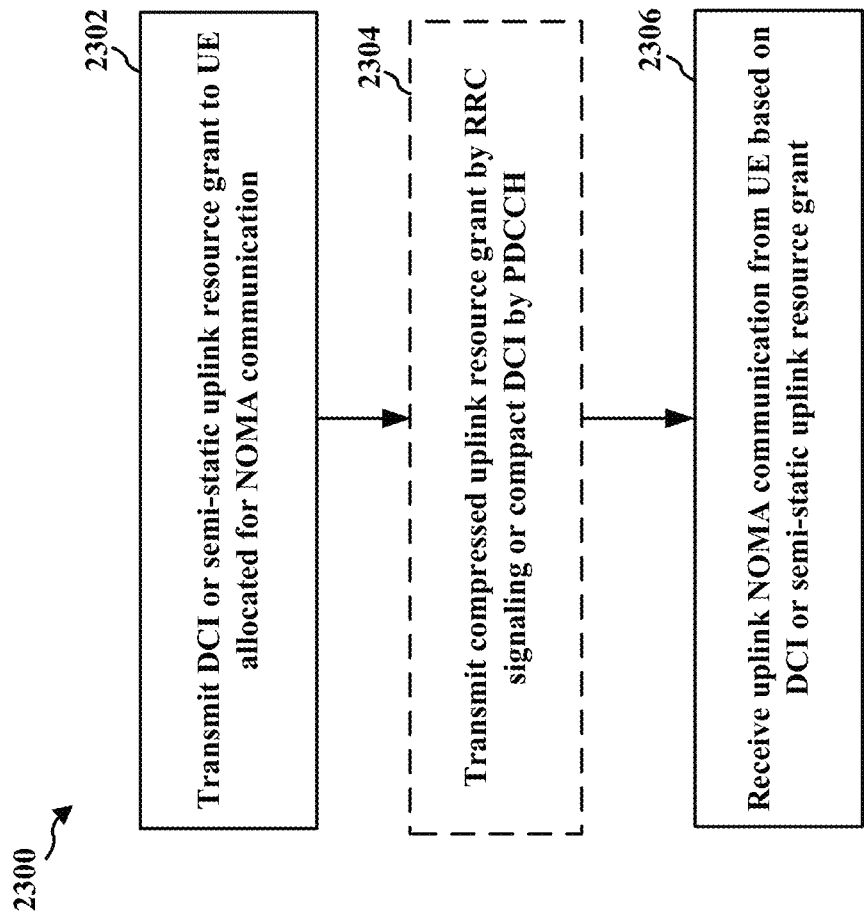
FIG. 23 is a flowchart of a method of wireless communication.

FIG. 23 is a flowchart 2300 of a method of wireless communication. The method may be performed by a base station (e.g., base station 102, 180, 310, 402, 1904, apparatus 2402; the processing system 2514, which may include memory 376 and which may be the entire base station 310 or a component of a base station, such as the TX processor 316, the RX processor 370, and/or the controller/processor 375) communicating with a UE (e.g., UE 104, 182, 350, 404, 1902, apparatus 2102). Optional aspects are illustrated with a dashed line. The methods described herein can provide a number of benefits, such as improving power savings and/or resource utilization.

At 2302, the base station can transmit DCI or semi-static uplink resource grant to the UE allocated for NOMA communication. For example, transmission component 2406 of apparatus 2402 may transmit DCI or semi-static uplink resource grant to the UE allocated for NOMA communication. A payload of the DCI or the semi-static uplink resource grant can be scrambled with a NOMA group RNTI or comprise NOMA transmission parameters indicated by an extended MCS table, as described in connection with the example in FIG. 18. The DCI can be received based on at least one of a group common control channel or RMSI for a common resource allocation. The DCI also comprise a CRC that is scrambled by the NOMA group RNTI. Also, the DCI can comprise one or more NOMA transmission parameters indicated by the extended MCS table. The one or more NOMA transmission parameters can comprise at least one of a spreading factor for a NOMA transmission, a seed of scrambling code for the NOMA transmission, and one or more layers for multiple branch transmission of the NOMA transmission, as mentioned above in connection with the example in FIG. 18. The DCI can also comprise a multiple stage DCI scrambled by the NOMA group RNTI.

At 2304, the base station can transmit the compressed uplink resource grant by RRC signaling or compact DCI by PDCCH. For example, transmission component 2406 of apparatus 2402 may transmit the compressed uplink resource grant by RRC signaling or compact DCI by PDCCH. The compressed uplink resource grant can be based on a table of NOMA transport formats. Further, the compressed uplink resource grant can indicate an index for a transport format from among multiple transport formats for the uplink NOMA communication. The compressed uplink resource grant can comprise an index of at least one transport format that is received through RRC signaling.

Finally, at 2306, the base station can receive uplink NOMA communication from the UE based on DCI or a semi-static uplink resource grant. For example, reception component 2404 of apparatus 2402 may receive uplink NOMA communication from the UE based on DCI or a semi-static uplink resource grant.

Figure 24:
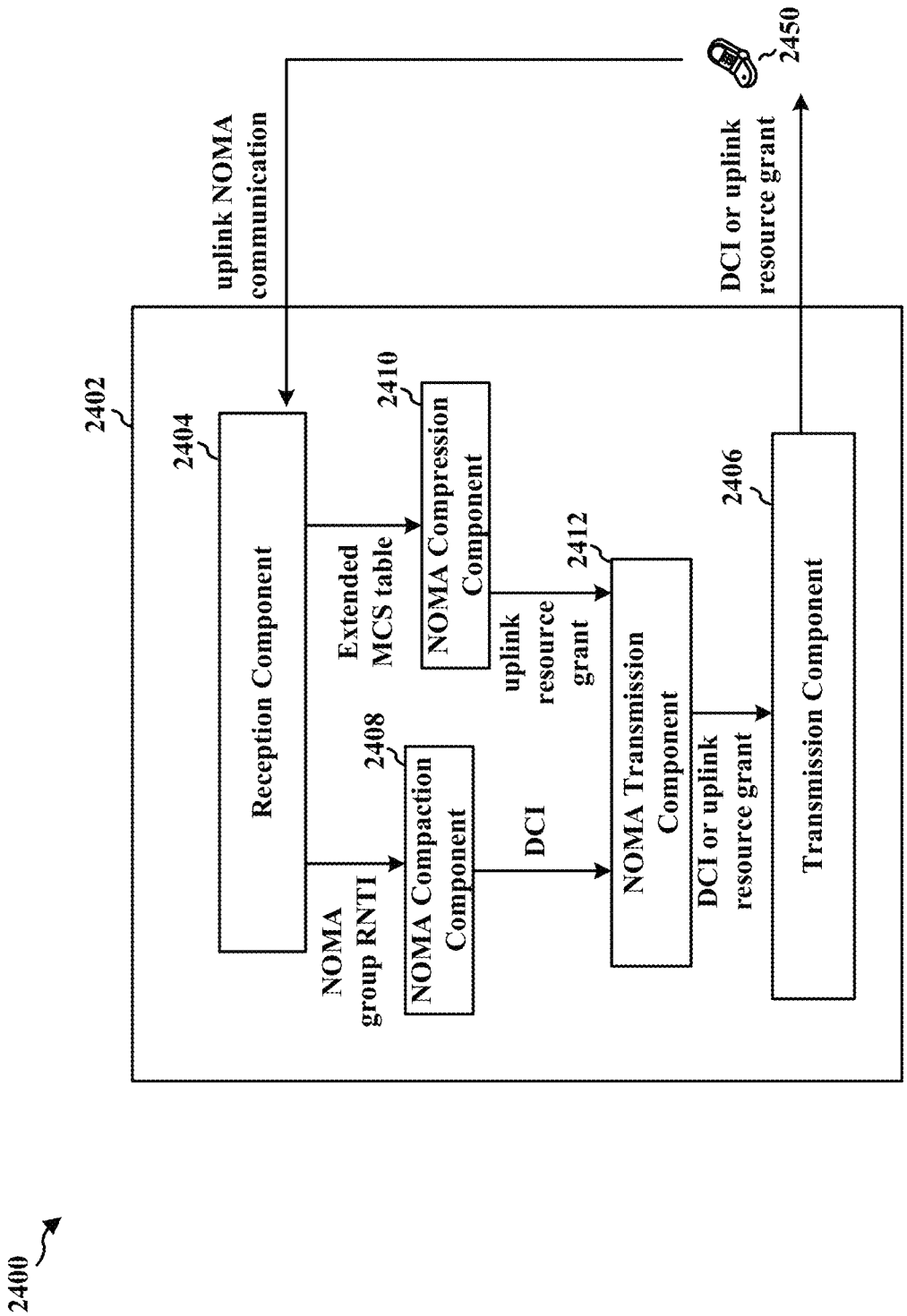
FIG. 24 is a conceptual data flow diagram illustrating the data flow between different means/components in an exemplary apparatus.

FIG. 24 is a conceptual data flow diagram 2400 illustrating the data flow between different means/components in an exemplary apparatus 2402. The apparatus may be a base station or a component of a base station. The apparatus includes a transmission component 2406 that is configured to transmit DCI or semi-static uplink resource grant to a UE allocated for NOMA communication. NOMA transmission component 2412 can also be configured to transmit compressed uplink resource grant by RRC signaling or compact DCI by PDCCH. The apparatus can also include a reception component 2404 that is configured to receive uplink communication from UE 2450. NOMA compaction component 2408 can be configured to receive uplink NOMA communication from the UE based on DCI. NOMA compression component 2410 can also be configured to receive uplink NOMA communication from the UE based on semi-static uplink resource grant.

The apparatus may include additional components that perform each of the blocks of the algorithm in the aforementioned flowcharts of FIGS. 19 and 23. As such, each block in the aforementioned flowcharts of FIGS. 19 and 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 25:
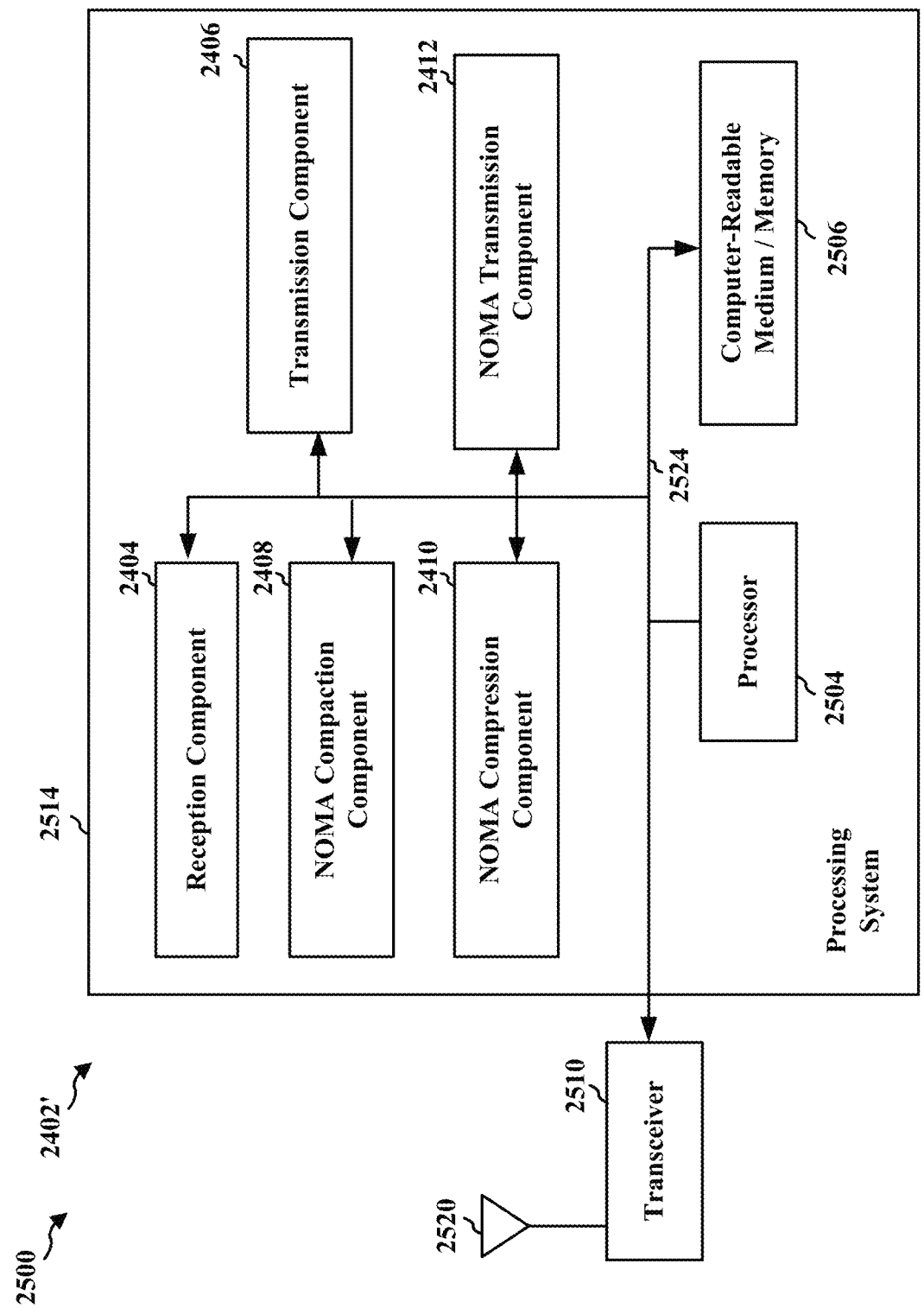
FIG. 25 is a diagram illustrating an example of a hardware implementation for an apparatus employing a processing system.

FIG. 25 is a diagram 2500 illustrating an example of a hardware implementation for an apparatus 2402' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware components, represented by the processor 2504, the components 2404, 2406, 2408, 2410, 2412, and the computer-readable medium/memory 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The transceiver 2510 receives a signal from the one or more antennas 2520, extracts information from the received signal, and provides the extracted information to the processing system 2514, specifically the reception component 2406. In addition, the transceiver 2510 receives information from the processing system 2514, specifically the transmission component 2404, and based on the received information, generates a signal to be applied to the one or more antennas 2520. The processing system 2514 includes a processor 2504 coupled to a computer-readable medium/memory 2506. The processor 2504 is responsible for general processing, including the execution of software stored on the computer-readable medium/memory 2506. The software, when executed by the processor 2504, causes the processing system 2514 to perform the various functions described supra for any particular apparatus. The computer-readable medium/memory 2506 may also be used for storing data that is manipulated by the processor 2504 when executing software. The processing system 2514 further includes at least one of the components 2404, 2406, 2408, 2410, 2412. The components may be software components running in the processor 2504, resident/stored in the computer readable medium/memory 2506, one or more hardware components coupled to the processor 2504, or some combination thereof. The processing system 2514 may be a component of the base station 310 and may include the memory 376 and/or at least one of the TX processor 316, the RX processor 370, and the controller/processor 375. Alternatively, the processing system 2514 may comprise the entire base station, e.g., base station 310.

In one configuration, the apparatus 2402/2402' for wireless communication includes means for transmitting DCI or a semi-static uplink resource grant to a UE allocated for NOMA communication with the UE. A payload of the DCI or the semi-static uplink resource grant can be scrambled with a NOMA group RNTI or comprises NOMA transmission parameters indicated by an extended MCS table. The apparatus can also include means for transmitting a compressed uplink resource grant by RRC signaling or a compact DCI by a PDCCH. The apparatus can also include means for receiving uplink NOMA communication from the UE. The aforementioned means may be one or more of the aforementioned components of the apparatus 2402 and/or the processing system 2514 of the apparatus 2402' configured to perform the functions recited by the aforementioned means. As described supra, the processing system 2514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
receiving, from a base station, an indication of resources in time and frequency allocated for Non-Orthogonal Multiple Access (NOMA) communication with the base station, wherein the indication of resources comprises a set of NOMA resource units (NA-RUs), wherein the set of NA-RUs are mapped to a time frequency resource grid with respect to a synchronization signal block (SSB) based on at least one of a center frequency of an NA-RU or a number of physical resource blocks (PRBs) within each NA-RU in the set of NA-RUs, wherein the indication of resources is based on a mapping index for the set of NA-RUs mapped to a time frequency resource grid and indexed in a sequential order, wherein the mapping index maps at least one of the set of NA-RUs to the time frequency resource grid; and
transmitting uplink NOMA communication to the base station based on the indication of resources received from the base station.

2. The method of claim 1, wherein the indication of resources is based on a NOMA raster of candidate locations for the NA-RUs.

3. The method of claim 1, wherein the indication comprises a starting location of the set of the NA-RUs and a number of the NA-RUs comprised in the set.

4. The method of claim 1, wherein the indication comprises a starting location of the set of the NA-RUs and an ending location of the set of the NA-RUs.

5. The method of claim 1, wherein the set of the NA-RUs comprise a number of NA-RUs that are contiguous in time or frequency.

6. The method of claim 1, wherein the set of the NA-RUs are interlaced in time or frequency within a resource grid spanning a system bandwidth in frequency and at least one slot in time.

7. The method of claim 1, wherein the uplink NOMA communication is transmitted to the base station, and multiple UEs share the set of the NA-RUs in a time and frequency domain.

8. A method of wireless communication at a base station, comprising:
transmitting, to a User Equipment (UE), an indication of resources in time and frequency allocated for Non-Orthogonal Multiple Access (NOMA) communication with the UE, wherein the indication of resources comprises a set of NOMA resource units (NA-RUs), wherein the set of NA-RUs are mapped to a time frequency resource grid with respect to a synchronization signal block (SSB) based on at least one of a center frequency of an NA-RU or a number of physical resource blocks (PRBs) within each NA-RU in the set of NA-RUs, wherein the indication of resources is based on a mapping index for the set of NA-RUs mapped to a time frequency resource grid and indexed in a sequential order, wherein the mapping index maps at least one of the set of NA-RUs to the time frequency resource grid; and
receiving uplink NOMA communication from the UE based on the indication of resources transmitted to the UE.

9. The method of claim 8, wherein the indication of resources is based on a NOMA raster of candidate locations for the NA-RUs.

10. The method of claim 8, wherein the indication comprises a starting location of the set of the NA-RUs and a number of the NA-RUs comprised in the set.

11. The method of claim 8, wherein the indication comprises a starting location of the set of the NA-RUs and an ending location of the set of the NA-RUs.

12. The method of claim 8, wherein the set of the NA-RUs comprise a number of NA-RUs that are contiguous in time or frequency.

13. The method of claim 8, wherein the set of the NA-RUs are interlaced in time or frequency within a resource grid spanning a system bandwidth in frequency and at least one slot in time.

14. The method of claim 8, wherein the uplink NOMA communication is received from the UE, and multiple UEs share the set of the NA-RUs in a time and frequency domain.

15. An apparatus for wireless communication, comprising:
means for receiving, from a base station, an indication of resources in time and frequency allocated for Non-Orthogonal Multiple Access (NOMA) communication with the base station, wherein the indication of resources comprises a set of NOMA resource units (NA-RUs), wherein the set of NA-RUs are mapped to a time frequency resource grid with respect to a synchronization signal block (SSB) based on at least one of a center frequency of an NA-RU or a number of physical resource blocks (PRBs) within each NA-RU in the set of NA-RUs, wherein the indication of resources is based on a mapping index for the set of NA-RUs mapped to a time frequency resource grid and indexed in a sequential order, wherein the mapping index maps at least one of the set of NA-RUs to the time frequency resource grid; and
means for transmitting uplink NOMA communication to the base station based on the indication of resources received from the base station.

16. The apparatus of claim 15, wherein the indication of resources is based on a NOMA raster of candidate locations for the NA-RUs.

17. The apparatus of claim 15, wherein the indication comprises a starting location of the set of the NA-RUs and a number of the NA-RUs comprised in the set.

18. The apparatus of claim 15, wherein the indication comprises a starting location of the set of the NA-RUs and an ending location of the set of the NA-RUs.

19. The apparatus of claim 15, wherein the set of the NA-RUs comprise a number of NA-RUs that are contiguous in time or frequency.

20. The apparatus of claim 15, wherein the set of the NA-RUs are interlaced in time or frequency within a resource grid spanning a system bandwidth in frequency and at least one slot in time.

21. The apparatus of claim 15, wherein the uplink NOMA communication is transmitted to the base station, and multiple UEs share the set of the NA-RUs in a time and frequency domain.

22. An apparatus for wireless communication, comprising:
  a memory; and
  at least one processor coupled to the memory and configured to:
    receive, from a base station, an indication of resources in time and frequency allocated for Non-Orthogonal Multiple Access (NOMA) communication with the base station, wherein the indication of resources comprises a set of NOMA resource units (NA-RUs), wherein the set of NA-RUs are mapped to a time frequency resource grid with respect to a synchronization signal block (SSB) based on at least one of a center frequency of an NA-RU or a number of physical resource blocks (PRBs) within each NA-RU in the set of NA-RUs, wherein the indication of resources is based on a mapping index for the set of NA-RUs mapped to a time frequency resource grid and indexed in a sequential order, wherein the mapping index maps at least one of the set of NA-RUs to the time frequency resource grid; and
    transmit uplink NOMA communication to the base station based on the indication of resources received from the base station.

23. The apparatus of claim 22, wherein the indication of resources is based on a NOMA raster of candidate locations for the NA-RUs.

24. The apparatus of claim 22, wherein the indication comprises a starting location of the set of the NA-RUs and a number of the NA-RUs comprised in the set.

25. The apparatus of claim 22, wherein the indication comprises a starting location of the set of the NA-RUs and an ending location of the set of the NA-RUs.

26. The apparatus of claim 22, wherein the set of the NA-RUs comprise a number of NA-RUs that are contiguous in time or frequency.

27. The apparatus of claim 22, wherein the set of the NA-RUs are interlaced in time or frequency within a resource grid spanning a system bandwidth in frequency and at least one slot in time.

28. The apparatus of claim 22, wherein the uplink NOMA communication is transmitted to the base station, and multiple UEs share the set of the NA-RUs in a time and frequency domain.

29. A non-transitory computer-readable medium storing computer executable code, comprising code to:
  receive, from a base station, an indication of resources in time and frequency allocated for Non-Orthogonal Multiple Access (NOMA) communication with the base station, wherein the indication of resources comprises a set of NOMA resource units (NA-RUs), wherein the set of NA-RUs are mapped to a time frequency resource grid with respect to a synchronization signal block (SSB) based on at least one of a center frequency of an NA-RU or a number of physical resource blocks (PRBs) within each NA-RU in the set of NA-RUs, wherein the indication of resources is based on a mapping index for the set of NA-RUs mapped to a time frequency resource grid and indexed in a sequential order, wherein the mapping index maps at least one of the set of NA-RUs to the time frequency resource grid; and
  transmit uplink NOMA communication to the base station based on the indication of resources received from the base station.

30. An apparatus for wireless communication, comprising:
  means for transmitting, to a User Equipment (UE), an indication of resources in time and frequency allocated for Non-Orthogonal Multiple Access (NOMA) communication with the UE, wherein the indication of resources comprises a set of NOMA resource units (NA-RUs), wherein the set of NA-RUs are mapped to a time frequency resource grid with respect to a synchronization signal block (SSB) based on at least one of a center frequency of an NA-RU or a number of physical resource blocks (PRBs) within each NA-RU in the set of NA-RUs, wherein the indication of resources is based on a mapping index for the set of NA-RUs mapped to a time frequency resource grid and indexed in a sequential order, wherein the mapping index maps at least one of the set of NA-RUs to the time frequency resource grid; and
  means for receiving uplink NOMA communication from the UE based on the indication of resources transmitted to the UE.

31. The apparatus of claim 30, wherein the indication of resources is based on a NOMA raster of candidate locations for the NA-RUs.

32. The apparatus of claim 30, wherein the indication comprises a starting location of the set of the NA-RUs and a number of the NA-RUs comprised in the set.

33. The apparatus of claim 30, wherein the indication comprises a starting location of the set of the NA-RUs and an ending location of the set of the NA-RUs.

34. The apparatus of claim 30, wherein the set of the NA-RUs comprise a number of NA-RUs that are contiguous in time or frequency.

35. The apparatus of claim 30, wherein the set of the NA-RUs are interlaced in time or frequency within a resource grid spanning a system bandwidth in frequency and at least one slot in time.

36. The apparatus of claim 30, wherein the uplink NOMA communication is received from the UE, and multiple UEs share the set of the NA-RUs in a time and frequency domain.

37. An apparatus for wireless communication, comprising:
  a memory; and
  at least one processor coupled to the memory and configured to:
    transmit, to a User Equipment (UE), an indication of resources in time and frequency allocated for Non-Orthogonal Multiple Access (NOMA) communication with the UE, wherein the indication of resources comprises a set of NOMA resource units (NA-RUs), wherein the set of NA-RUs are mapped to a time frequency resource grid with respect to a synchronization signal block (SSB) based on at least one of a center frequency of an NA-RU or a number of physical resource blocks (PRBs) within each NA- RU in the set of NA-RUs, wherein the indication of resources is based on a mapping index for the set of NA-RUs mapped to a time frequency resource grid and indexed in a sequential order, wherein the mapping index maps at least one of the set of NA-RUs to the time frequency resource grid; and receive uplink NOMA communication from the UE based on the indication of resources transmitted to the UE.

38. The apparatus of claim 37, wherein the indication of resources is based on a NOMA raster of candidate locations for the NA-RUs.

39. The apparatus of claim 37, wherein the indication comprises a starting location of the set of the NA-RUs and a number of the NA-RUs comprised in the set.

40. The apparatus of claim 37, wherein the indication comprises a starting location of the set of the NA-RUs and an ending location of the set of the NA-RUs.

41. The apparatus of claim 37, wherein the set of the NA-RUs comprise a number of NA-RUs that are contiguous in time or frequency.

42. The apparatus of claim 37, wherein the set of the NA-RUs are interlaced in time or frequency within a resource grid spanning a system bandwidth in frequency and at least one slot in time.

43. The apparatus of claim 37, wherein the uplink NOMA communication is received from the UE, and multiple UEs share the same NR-RUs in time and frequency domain.

44. A non-transitory computer-readable medium storing computer executable code, comprising code to:

transmit, to a User Equipment (UE), an indication of resources in time and frequency allocated for Non-Orthogonal Multiple Access (NOMA) communication with the UE, wherein the indication of resources comprises a set of NOMA resource units (NA-RUs), wherein the set of NA-RUs are mapped to a time frequency resource grid with respect to a synchronization signal block (SSB) based on at least one of a center frequency of an NA-RU or a number of physical resource blocks (PRBs) within each NA-RU in the set of NA-RUs, wherein the indication of resources is based on a mapping index for the set of NA-RUs mapped to a time frequency resource grid and indexed in a sequential order, wherein the mapping index maps at least one of the set of NA-RUs to the time frequency resource grid; and receive uplink NOMA communication from the UE based on the indication of resources transmitted to the UE.

* * * * *